US010472466B2

(12) United States Patent
Mizuta et al.

(10) Patent No.: US 10,472,466 B2
(45) Date of Patent: Nov. 12, 2019

(54) MONOMER COMPOSITION AND CURABLE COMPOSITION CONTAINING SAME

(71) Applicant: DAICEL CORPORATION, Osaka-shi, Osaka (JP)

(72) Inventors: Tomoya Mizuta, Tokyo (JP); Keizo Inoue, Himeji (JP)

(73) Assignee: DAICEL CORPORATION, Osaka-Shi (JP)

( * ) Notice: Subject to any disclaimer, the term of this patent is extended or adjusted under 35 U.S.C. 154(b) by 0 days.

(21) Appl. No.: 15/321,432

(22) PCT Filed: Jun. 23, 2015

(86) PCT No.: PCT/JP2015/068087
§ 371 (c)(1),
(2) Date: Dec. 22, 2016

(87) PCT Pub. No.: WO2015/199093
PCT Pub. Date: Dec. 30, 2015

(65) Prior Publication Data
US 2017/0158812 A1 Jun. 8, 2017

(30) Foreign Application Priority Data

Jun. 27, 2014 (JP) ................................ 2014-133053
Jun. 27, 2014 (JP) ................................ 2014-133055
Jun. 27, 2014 (JP) ................................ 2014-133056
Jun. 27, 2014 (JP) ................................ 2014-133058
Jun. 27, 2014 (JP) ................................ 2014-133059

(51) Int. Cl.
*C08G 65/18* (2006.01)
*B41J 2/01* (2006.01)
*B41M 5/00* (2006.01)
*C08G 59/24* (2006.01)
*C09D 11/30* (2014.01)
*C08G 59/68* (2006.01)
*C09D 11/101* (2014.01)
*C09D 11/102* (2014.01)
*C09D 4/00* (2006.01)
*C09D 11/32* (2014.01)

(52) U.S. Cl.
CPC ................ *C08G 65/18* (2013.01); *B41J 2/01* (2013.01); *B41M 5/00* (2013.01); *C08G 59/24* (2013.01); *C08G 59/68* (2013.01); *C09D 4/00* (2013.01); *C09D 11/101* (2013.01); *C09D 11/102* (2013.01); *C09D 11/30* (2013.01); *C09D 11/32* (2013.01)

(58) Field of Classification Search
None
See application file for complete search history.

(56) References Cited

U.S. PATENT DOCUMENTS

| 3,598,785 | A | 8/1971 | Achon et al. |
| 4,009,182 | A | 2/1977 | Ardis et al. |
| 4,965,342 | A | 10/1990 | Vandenberg et al. |
| 2004/0019128 | A1 | 1/2004 | Kondo |
| 2004/0050292 | A1 | 3/2004 | Nakajima et al. |
| 2004/0259971 | A1 | 12/2004 | Sasa |
| 2005/0113476 | A1* | 5/2005 | Akiyama ............. C09D 11/101 522/1 |
| 2006/0223978 | A1 | 10/2006 | Kong |
| 2007/0034515 | A1 | 2/2007 | Kong et al. |
| 2007/0101898 | A1 | 5/2007 | Akiyama et al. |
| 2007/0185224 | A1 | 8/2007 | Akiyama et al. |
| 2007/0202437 | A1 | 8/2007 | Ishibashi et al. |
| 2007/0270520 | A1 | 11/2007 | Akiyama et al. |
| 2008/0272328 | A1 | 11/2008 | Kong |
| 2008/0296159 | A1 | 12/2008 | Kong et al. |
| 2010/0026711 | A1 | 2/2010 | Muramoto |
| 2012/0027342 | A1 | 2/2012 | Yoshida et al. |
| 2015/0368397 | A1 | 12/2015 | Suwa et al. |

FOREIGN PATENT DOCUMENTS

| EP | 1 826 252 A1 | 8/2007 |
| EP | 2 226 367 A1 | 9/2010 |
| JP | 2-029428 A | 1/1990 |
| JP | 9-183927 A | 7/1997 |
| JP | 2004-010783 A | 1/2004 |

(Continued)

OTHER PUBLICATIONS

Daicel (https://www.daicel.com/yuuki/en/product/index.php?act=detail&page=1&id=220) (date unknown).*
Extended European Search Report dated Nov. 13, 2017, in European Patent Application No. 15812150.9.
International Search Report (PCT/ISA/210), issued in PCT/JP2015/068084, dated Aug. 18, 2015.
International Search Report (PCT/ISA/210), issued in PCT/JP2015/068085, dated Sep. 29, 2015.

(Continued)

*Primary Examiner* — Kuo Liang Peng
(74) *Attorney, Agent, or Firm* — Birch, Stewart, Kolasch & Birch, LLP

(57) ABSTRACT

Provided is a monomer composition that has rapid curability and can be cured rapidly, even in the presence of oxygen and/or water, to form a cured product having excellent adhesion to a wide variety of substrates. The monomer composition according to the present invention contains a vinyl ether compound (A). The vinyl ether compound (A) includes a vinyl ether compound (a) having a cyclic ether skeleton. The monomer composition further contains at least one compound selected from the group consisting of a vinyl ether compound (a') having a chain hydrocarbon skeleton, a divinyl ether compound (a"-1) having a cyclic hydrocarbon skeleton, an oxetane compound (B), and an epoxy compound (C).

9 Claims, No Drawings

(56) References Cited

FOREIGN PATENT DOCUMENTS

| JP | 2004-091552 A | 3/2004 |
|---|---|---|
| JP | 2005-154734 A | 6/2005 |
| JP | 2007-137926 A | 6/2007 |
| JP | 2007-211098 A | 8/2007 |
| JP | 2007-211099 A | 8/2007 |
| JP | 2008-087252 A | 4/2008 |
| JP | 2008-189821 A | 8/2008 |
| JP | 2008-535975 A | 9/2008 |
| JP | 2010-007000 A | 1/2010 |
| JP | 2012-36155 A | 2/2012 |
| JP | 2014-201534 A | 10/2014 |
| WO | WO 2008/111283 A1 | 9/2008 |
| WO | WO 2011/125538 A1 | 10/2011 |
| WO | WO 2014/046095 A1 | 3/2014 |

OTHER PUBLICATIONS

International Search Report (PCT/ISA/210), issued in PCT/JP2015/068086, dated Aug. 18, 2015.
International Search Report (PCT/ISA/210), issued in PCT/JP2015/068087, dated Sep. 15, 2015.
Written Opinion of the International Searching Authority (PCT/ISA/237), issued in PCT/JP2015/068084, dated Aug. 18, 2015.
Written Opinion of the International Searching Authority (PCT/ISA/237), issued in PCT/JP2015/068085, dated Sep. 29, 2015.
Written Opinion of the International Searching Authority (PCT/ISA/237), issued in PCT/JP2015/068086, dated Aug. 18, 2015.
Written Opinion of the International Searching Authority (PCT/ISA/237), issued in PCT/JP2015/068087, dated Sep. 15, 2015.
Extended European Search Report dated Nov. 8, 2017, in European Patent Application No. 15812646.6.
Japanese Notification of Reasons for Refusal for Application No. 2015-126001, dated Sep. 25, 2018, with English language translation.
Office Action issued in the counterpart European Patent Application No. 15810852.2, dated Nov. 8, 2018.
Extended European Search Report issued in European Application No. 15810852.2 dated Nov. 16, 2017.
Extended European Search Report issued in European Application No. 15811102.1 dated Jan. 4, 2018.
Office Action dated Jun. 11, 2018 in U.S. Appl. No. 15/321,471.

* cited by examiner

MONOMER COMPOSITION AND CURABLE COMPOSITION CONTAINING SAME

TECHNICAL FIELD

The present invention relates to a monomer composition, and a curable composition including the monomer composition. The curable composition is advantageously used for UV-curable (ultraviolet-curable) inkjet inks. This application claims priority to: Japanese Patent Application No. 2014-133053, Japanese Patent Application No. 2014-133055, Japanese Patent Application No. 2014-133056, Japanese Patent Application No. 2014-133058, and Japanese Patent Application No. 2014-133059, each filed Jun. 27, 2014 to Japan, the entire contents of each of which applications are incorporated herein by reference.

BACKGROUND ART

Inkjet recording is a technique in which ink droplets are ejected (jetted) onto a recording medium to form recording dots as printing. This technique does not require master plates and is advantageously used in small-quantity wide-variety printing applications. Known inkjet inks for use in the inkjet recording technique include cationically-curable inks and radically-curable inks.

The radically-curable inks have been widely used typically because these inks have rapid curability and can be derived from a wide variety of monomers. However, from the viewpoint of dischargeability, the inkjet recording technique employs low-viscosity inks, which allow oxygen in the air to readily diffuse/migrate into the inks. In addition, such inks, as being formed into small droplets upon printing, have large surface areas and are readily exposed to oxygen. Disadvantageously, therefore, the radically-curable inks significantly suffer from cure inhibition by oxygen and are inhibited from curing by oxygen, to bleed and/or to include large amounts of residual unreacted monomers which cause odors. Additionally disadvantageously, the radically-curable inks have poor substrate adhesion and require processing on the substrate surface so as to offer better adhesion.

In contrast, the cationically-curable inks do not suffer from cure inhibition by oxygen. In addition, these inks are known to have superior substrate adhesion as compared with the radically-curable inks. Patent Literature (PTL) 1, PTL 2, and PTL 3 each describe that a cationically-curable ink including a dispersion medium and a pigment can form an ink layer having excellent curability and excellent adhesion to the substrate (substrate adhesion), when monomers constituting the dispersion medium contain a vinyl ether compound having a cyclic ether skeleton in an amount of 30 weight percent or more of all monomers contained in the dispersion medium.

CITATION LIST

Patent Literature

PTL 1: Japanese Unexamined Patent Application Publication (JP-A) No. 2005-154734
PTL 2: JP-A No. 2007-211098
PTL 3: JP-A No. 2007-211099

SUMMARY OF INVENTION

Technical Problem

However, such cationically-curable inks containing a vinyl ether compound having a cyclic ether skeleton in a large amount as described above were found to be practically unsuitable. This is because the vinyl ether compound having a cyclic ether skeleton tends to absorb moisture (water) and thereby causes the cationically-curable inks to be susceptible to cure inhibition by water and to undergo curing failure when used during humid periods and/or when absorbing moisture from the air during storage process.

Accordingly, the present invention has an object to provide a monomer composition that has rapid curability and can be rapidly cured, even in the presence of oxygen and/or water, to form a cured product having excellent adhesion to a wide variety of substrates.

The present invention has another object to provide a curable composition that includes the monomer composition and a photoacid generator.

The present invention has yet another object to provide a UV-curable inkjet ink that includes the curable composition and a pigment.

Solution to Problem

After intensive investigations to achieve the objects, the inventors of the present invention fond a curable composition containing a monomer composition that includes such a vinyl ether compound having a cyclic ether skeleton in a lower content and further containing, instead of part of the vinyl ether compound, a specific monomer or monomers in combination; and found that this curable composition can be rapidly cured by ultraviolet irradiation, even in the presence of oxygen and/or water, to form a cured product that offers excellent adhesion to a wide variety of substrates (namely, has selectivity to a wide variety of substrates). The present invention has been made on the basis of these findings.

Specifically, the present invention provides, in an aspect, a monomer composition containing a vinyl ether compound (A). The vinyl ether compound (A) includes a vinyl ether compound (a) having a cyclic ether skeleton. The monomer composition further contains at least one compound selected from the group consisting of a vinyl ether compound (a') having a chain hydrocarbon skeleton, a divinyl ether compound (a"-1) having a cyclic hydrocarbon skeleton, an oxetane compound (B), and an epoxy compound (C).

In the monomer composition, the vinyl ether compound (a) having a cyclic ether skeleton may include at least one of a compound represented by Formula (a-1) and a compound represented by Formula (a-2):

[Chem. 1]

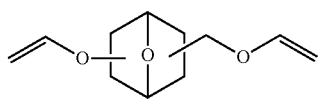
(a-1)

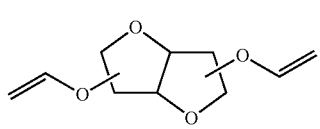
(a-2)

In an embodiment, the monomer composition may be a monomer composition as follows. This monomer composition contains the vinyl ether compound (A), the oxetane compound (B), and the epoxy compound (C). The vinyl ether compound (A) includes the at least one of the compound represented by Formula (a-1) and the compound represented by Formula (a-2). The oxetane compound (B) includes 3-ethyl-3-[(2-ethylhexyloxy)methyl]oxetane. The at least one of the compound represented by Formula (a-1) and the compound represented by Formula (a-2) is present in a content of from 5 weight percent to less than 30 weight percent of the total weight of the monomer composition.

In the monomer composition, the epoxy compound (C) may include an epoxy compound containing a cyclohexene oxide group.

The epoxy compound (C) may be present in a content of 5 to 80 weight percent of the total weight of the monomer composition.

In the monomer composition, the 3-ethyl-3-[(2-ethylhexyloxy)methyl]oxetane may be present in a content of 5 to 80 weight percent of the total weight of the monomer composition.

In another embodiment, the monomer composition may be a monomer composition as follows. This monomer composition contains the vinyl ether compound (A) and the oxetane compound (B). The vinyl ether compound (A) includes the at least one of the compound represented by Formula (a-1) and the compound represented by Formula (a-2). The oxetane compound (B) includes a compound represented by Formula (b'):

[Chem. 2]

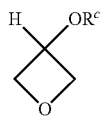

(b')

where $R^c$ represents a monovalent hydrocarbon group.

In the monomer composition, the compound represented by Formula (b') may include at least one of 3-allyloxyoxetane and 3-(2-ethylhexyloxy)oxetane.

In the monomer composition, the compound represented by Formula (b') may be present in a content of 5 to 90 weight percent of the total weight of the monomer composition.

In the monomer composition, the at least one of the compound represented by Formula (a-1) and the compound represented by Formula (a-2) may be present in a content of from 5 weight percent to less than 30 weight percent of the total weight of the monomer composition.

The monomer composition may further contain the epoxy compound (C), where the epoxy compound (C) includes a compound containing a cyclohexene oxide group.

In the monomer composition, the epoxy compound (C) may be present in a content of 5 to 80 weight percent of the total weight of the monomer composition.

In another embodiment, the monomer composition may be a monomer composition as follows. This monomer composition contains the vinyl ether compound (A) and the epoxy compound (C). The vinyl ether compound (A) includes the at least one of the compound represented by Formula (a-1) and the compound represented by Formula (a-2) in an amount of from 5 weight percent to less than 30 weight percent of the total weight of the monomer composition. The epoxy compound (C) includes 1,2:8,9-diepoxylimonene in an amount of greater than 40 weight percent of the total weight of the monomer composition.

The monomer composition may further contain the oxetane compound (B), which is a monomer, in an amount of 5 to 50 weight percent of the total weight of the monomer composition.

In another embodiment, the monomer composition may be a monomer composition as follows. This monomer composition contains the vinyl ether compound (A), the oxetane compound (B), and the epoxy compound (C). The vinyl ether compound (A) includes the at least one of the compound represented by Formula (a-1) and the compound represented by Formula (a-2) in an amount of from 5 weight percent to less than 30 weight percent of the total weight of the monomer composition. The oxetane compound (B) includes a monofunctional oxetane compound in an amount of 10 to 85 weight percent of the total weight of the monomer composition, where the monofunctional oxetane compound includes 3-ethyl-3-[(2-ethylhexyloxy)methyl]oxetane. The epoxy compound (C) includes 1,2:8,9-diepoxylimonene in an amount of 10 to 40 weight percent of the total weight of the monomer composition.

In another embodiment, the monomer composition may be a monomer composition as follows. This monomer composition contains the vinyl ether compound (A) and the oxetane compound (B). The vinyl ether compound (A) includes the at least one of the compound represented by Formula (a-1) and the compound represented by Formula (a-2), and the divinyl ether compound (a''-1) having a cyclic hydrocarbon skeleton. The oxetane compound (B) includes a monofunctional oxetane compound.

In the monomer composition, the divinyl ether compound (a''-1) having a cyclic hydrocarbon skeleton may include a compound represented by Formula (a''-1):

[Chem. 3]

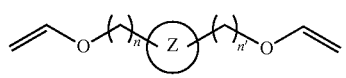

(a''-1)

where Ring Z is a ring selected from rings represented by Formulae (z-1) to (z-5); and n and n' each represent, identically or differently, an integer of 0 or more, Formulae (z-1) to (z-5) are expressed as follows:

[Chem. 4]

(z-1)

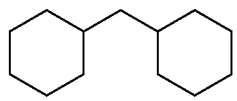

(z-2)

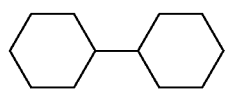

(z-3)

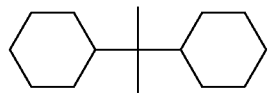

(z-4)

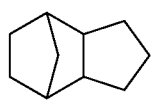

(z-5)

In the monomer composition, the at least one of the compound represented by Formula (a-1) and the compound represented by Formula (a-2), and the divinyl ether compound (a"-1) having a cyclic hydrocarbon skeleton may be present in a total content of 10 to 80 weight percent of the total weight of the monomer composition.

In the monomer composition, the at least one of the compound represented by Formula (a-1) and the compound represented by Formula (a-2) may be present in a content of from 5 weight percent to less than 30 weight percent of the total weight of the monomer composition.

In the monomer composition, the monofunctional oxetane compound may be present in a content of 10 to 70 weight percent of the total weight of the monomer composition.

The monomer composition may further contain the epoxy compound (C), where the epoxy compound (C) includes an epoxy compound containing a cyclohexene oxide group.

In the monomer composition, the epoxy compound (C) may be present in a content of 5 to 80 weight percent of the total weight of the monomer composition.

In another embodiment, the monomer composition may be a monomer composition as follows. This monomer composition contains the vinyl ether compound (A). The monomer composition contains a monofunctional monomer or monomers in a content of 20 to 70 weight percent of the total weight of the monomer composition. The monomer composition contains the vinyl ether compound (a) having a cyclic ether skeleton and the vinyl ether compound (a') having a chain hydrocarbon skeleton in a total content of 10 to 40 weight percent of the total weight of the monomer composition. The vinyl ether compound (a) having a cyclic ether skeleton is present in a content of from 5 weight percent to less than 30 weight percent of the total weight of the monomer composition.

In the monomer composition, the vinyl ether compound (A) may further include a vinyl ether compound (a") having a cyclic hydrocarbon skeleton in an amount of 1 to 50 weight percent of the total weight of the monomer composition.

The monomer composition may further contain the oxetane compound (B) in an amount of 5 to 80 weight percent of the total weight of the monomer composition.

The monomer composition may further contain the epoxy compound (C) in an amount of 5 to 80 weight percent of the total weight of the monomer composition.

The present invention also provides, in another aspect, a curable composition that contains the monomer composition and a photoacid generator.

The curable composition may further contain a sensitizer alone or in combination with a sensitizing auxiliary.

The monomer composition may have a surface tension (at 25° C. and 1 atmospheric pressure) of 10 to 50 mN/m and a viscosity (at 25° C. and a shear rate of 10 (1/s)) of 1 to 1000 mPa·s.

The curable composition may be used in or for UV-curable inkjet inks.

The present invention provides, in yet another aspect, a UV-curable inkjet ink that contains the curable composition and at least one selected from the group consisting of pigments and dyes.

The UV-curable inkjet ink may further contain a dispersant.

Accordingly, the present invention relates to followings.

(1) The present invention relates to a monomer composition containing a vinyl ether compound (A). The vinyl ether compound (A) includes a vinyl ether compound (a) having a cyclic ether skeleton. The monomer composition further contains at least one compound selected from the group consisting of a vinyl ether compound (a') having a chain hydrocarbon skeleton, a divinyl ether compound (a"-1) having a cyclic hydrocarbon skeleton, an oxetane compound (B), and an epoxy compound (C).

(2) In the monomer composition according to (1), the vinyl ether compound (a) having a cyclic ether skeleton may include at least one of a compound represented by Formula (a-1) and a compound represented by Formula (a-2).

(3) The monomer composition according to (2) may be a monomer composition as follows. This monomer composition contains the vinyl ether compound (A), the oxetane compound (B), and the epoxy compound (C). The vinyl ether compound (A) includes the at least one of the compound represented by Formula (a-1) and the compound represented by Formula (a-2). The oxetane compound (B) includes 3-ethyl-3-((2-ethylhexyloxy)methyl)oxetane. The at least one of the compound represented by Formula (a-1) and the compound represented by Formula (a-2) is present in a content of from 5 weight percent to less than 30 weight percent of the total weight of the monomer composition.

(4) In the monomer composition according to (3), the epoxy compound (C) may include an epoxy compound containing a cyclohexene oxide group.

(5) In the monomer composition according to one of (3) and (4), the epoxy compound (C) may be present in a content of 5 to 80 weight percent of the total weight of the monomer composition.

(6) In the monomer composition according to any one of (3) to (5), the 3-ethyl-3-((2-ethylhexyloxy)methyl)oxetane may be present in a content of 5 to 80 weight percent of the total weight of the monomer composition.

(7) The monomer composition according to (2) may be a monomer composition as follows. This monomer composition contains the vinyl ether compound (A) and the oxetane compound (B). The vinyl ether compound (A) includes the at least one of the compound represented by Formula (a-1) and the compound represented by Formula (a-2). The oxetane compound (B) includes a compound represented by Formula (b')

(8) In the monomer composition according to (7), the compound represented by Formula (b') may include at least one of 3-allyloxyoxetane and 3-(2-ethylhexyloxy)oxetane.

(9) In the monomer composition according to one of (7) and (8), the compound represented by Formula (b') may be present in a content of 5 to 90 weight percent of the total weight of the monomer composition.

(10) In the monomer composition according to any one of (7) to (9), the at least one of the compound represented by Formula (a-1) and the compound represented by Formula (a-2) may be present in a content of from 5 weight percent to less than 30 weight percent of the total weight of the monomer composition.

(11) The monomer composition according to any one of (7) to (10) may further contain the epoxy compound (C), where the epoxy compound (C) includes a compound containing a cyclohexene oxide group.

(12) In the monomer composition according to (11), the epoxy compound (C) may be present in a content of 5 to 80 weight percent of the total weight of the monomer composition.

(13) The monomer composition according to (2) may be a monomer composition as follows. This monomer composition contains the vinyl ether compound (A) and the epoxy compound (C). The vinyl ether compound (A) includes the at least one of the compound represented by Formula (a-1) and the compound represented by Formula (a-2) in an amount of from 5 weight percent to less than 30 weight the total weight of the monomer composition. The epoxy compound (C) includes 1,2:8,9-diepoxylimonene in an amount of greater than 40 weight percent of the total weight of the monomer composition.

(14) The monomer composition according to (13) may further contain the oxetane compound (B), which is a monomer, in an amount of 5 to 50 weight percent of the total weight of the monomer composition.

(15) The monomer composition according to (2) may be a monomer composition as follows. This monomer composition contains the vinyl ether compound (A), the oxetane compound (B), and the epoxy compound (C). The vinyl ether compound (A) includes the at least one of the compound represented by Formula (a-1) and the compound represented by Formula (a-2) in an amount of from 5 weight percent to less than 30 weight percent of the total weight of the monomer composition. The oxetane compound (B) includes a monofunctional oxetane compound in an amount of 10 to 85 weight percent of the total weight of the monomer composition, where the monofunctional oxetane compound includes 3-ethyl-3-((2-ethylhexyloxy)methyl)oxetane. The epoxy compound (C) includes 1,2:8,9-diepoxylimonene in an amount of 10 to 40 weight percent of the total weight of the monomer composition.

(16) The monomer composition according to (2) may be a monomer composition as follows. This monomer composition contains the vinyl ether compound (A) and the oxetane compound (B). The vinyl ether compound (A) includes the at least one of the compound represented by Formula (a-1) and the compound represented by Formula (a-2), and the divinyl ether compound (a"-1) having a cyclic hydrocarbon skeleton. The oxetane compound (B) includes a monofunctional oxetane compound.

(17) In the monomer composition according to (16), the divinyl ether compound (a"-1) having a cyclic hydrocarbon skeleton may include a compound represented by Formula (a"-1).

(18) In the monomer composition according to one of (16) and (17), the at least one of the compound represented by Formula (a-1) and the compound represented by Formula (a-2), and the divinyl ether compound (a"-1) having a cyclic hydrocarbon skeleton may be present in a total content of 10 to 80 weight percent of the total weight of the monomer composition.

(19) In the monomer composition according to any one of (16) to (18), the at least one of the compound represented by Formula (a-1) and the compound represented by Formula (a-2) may be present in a content of from 5 weight percent to less than 30 weight percent of the total weight of the monomer composition.

(20) In the monomer composition according to any one of (16) to (19), the monofunctional oxetane compound may be present in a content of 10 to 70 weight percent of the total weight of the monomer composition.

(21) The monomer composition according to any one of (16) to (20) may further contain the epoxy compound (C), where the epoxy compound (C) includes an epoxy compound containing a cyclohexene oxide group.

(22) In the monomer composition according to (21), the epoxy compound (C) may be present in a content of 5 to 80 weight percent of the total weight of the monomer composition.

(23) The monomer composition according to one of (1) and (2) may be a monomer composition as follows. This monomer composition contains the vinyl ether compound (A). The monomer composition contains a monofunctional monomer or monomers in an amount of 20 to 70 weight percent of the total weight of the monomer composition. The monomer composition contains the vinyl ether compound (a) having a cyclic ether skeleton and the vinyl ether compound (a') having a chain hydrocarbon skeleton in a total amount of 10 to 40 weight percent of the total weight of the monomer composition. The vinyl ether compound (a) having a cyclic ether skeleton is present in a content of from 5 weight percent to less than 30 weight percent of the total weight of the monomer composition.

(24) In the monomer composition according to (23), the vinyl ether compound (A) may further include a vinyl ether compound (a") having a cyclic hydrocarbon skeleton in an amount of 1 to 50 weight percent of the total weight of the monomer composition.

(25) The monomer composition according to one of (23) and (24) may further contain the oxetane compound (B) in an amount of 5 to 80 weight percent of the total weight of the monomer composition.

(26) The monomer composition according to any one of (23) to (25) may further contain the epoxy compound (C) in an amount of 5 to 80 weight percent of the total weight of the monomer composition.

(27) The present invention also relates to a curable composition that contains the monomer composition according to any one of (1) to (26), and a photoacid generator.

(28) The curable composition according to (27) may further contain a sensitizer alone or in combination with a sensitizing auxiliary.

(29) The curable composition according to one of (27) and (28) may have a surface tension (at 25° C. and 1 atmospheric pressure) of 10 to 50 mN/m and a viscosity (at 25° C. and a shear rate of 10 (1/s)) of 1 to 1000 mPa·s.

(30) The curable composition according to any one of (27) to (29) may be used for UV-curable inkjet inks.

(31) The present invention also relates to a UV-curable inkjet ink that contains the curable composition according to any one of (27) to (30) and at least one selected from the group consisting of pigments and dyes.

(32) The UV-curable inkjet ink according to (31) may further contain a dispersant.

Advantageous Effects of Invention

The monomer composition according to the present invention has the above-mentioned configuration and, when incorporated with a photoacid generator, gives a curable composition as follows. This curable composition has low viscosity and offers excellent dischargeability before ultraviolet irradiation and, upon ultraviolet irradiation, can be rapidly cured even in the presence of oxygen and/or water, to form a cured product having excellent adhesion to a wide variety of substrates. The curable composition resists deterioration in curability even when absorbing moisture (water) from the air during the storage process. Namely, the curable composition has excellent storage stability. In addition, the curable composition according to the present invention, as having excellent curability, less causes monomers to remain as unreacted, and significantly less causes odors derived from such unreacted monomers. Thus, the curable composition according to the present invention is advantageously usable for UV-curable inkjet inks.

The UV-curable inkjet ink according to the present invention includes the curable composition having the characteristic properties and, when used, can form an ink layer (ink film) with extremely high definition in an air atmosphere at high speed, where the ink layer can be formed without limitations on humidity conditions and substrates (articles to be printed), while less causing odors. The UV-curable inkjet ink according to the present invention is therefore advantageously usable in the field of industrial printing.

DESCRIPTION OF EMBODIMENTS

Vinyl Ether Compound (A)

Vinyl ether compounds are monomers (in particular, cationically polymerizable monomers) containing a vinyl ether group, which group serves as a polymerizable group. The vinyl ether compounds (A) include vinyl ether compounds (a) having a cyclic ether skeleton, vinyl ether compounds (a') having a chain hydrocarbon skeleton, and vinyl ether compounds (a") having a cyclic hydrocarbon skeleton. The "vinyl ether compounds" include monofunctional vinyl ether compounds and multifunctional vinyl ether compounds.

The vinyl ether compounds (a) having a cyclic ether skeleton are represented typically by Formula (a):

where R represents a group resulting from removing "s" hydrogen atom(s) from the structural formula of an oxygen-containing heterocyclic ring, where oxygen serves as a heteroatom; and s represents an integer of 1 or more.

Non-limiting examples of the oxygen-containing heterocyclic ring, where oxygen serves as a heteroatom, include 3-membered rings such as oxirane ring; 4-membered rings such as oxetane ring; 5-membered rings such as furan, tetrahydrofuran, oxazole, isoxazole, and γ-butyrolactone rings; 6-membered rings such as 4-oxo-4H-pyran, tetrahydropyran, and morpholine rings; fused rings such as hexahydrofuro[3,2-b]furan, benzofuran, isobenzofuran, 4-oxo-4H-chromene, chroman, and isochroman rings; and bridged rings such as 7-oxabicyclo[2.2.1]heptane, 3-oxatricyclo[4.3.1.1$^{4,8}$]undecan-2-one, and 3-oxatricyclo[4.2.1.0$^{4,8}$]nonan-2-one rings.

The oxygen-containing heterocyclic ring, where oxygen serves as a heteroatom, may have one or more of a variety of substituents. Non-limiting examples of the substituents include alkyl including $C_1$-$C_4$ alkyl such as methyl and ethyl; cycloalkyl; aryl such as phenyl and naphthyl; halogen; oxo; hydroxy; substituted oxy such as alkoxy, aryloxy, aralkyloxy, and acyloxy; carboxy; substituted oxycarbonyl such as alkoxycarbonyl, aryloxycarbonyl, and aralkyloxycarbonyl; substituted or unsubstituted carbamoyl; cyano; nitro; substituted or unsubstituted amino; sulfo; and heterocyclic groups. The hydroxy and carboxy may each be protected with a protecting group which is commonly used in the field of organic synthesis.

The number s represents an integer of 1 or more and is typically 1 to 10.

Non-limiting examples of the vinyl ether compounds (a) having a cyclic ether skeleton include a compound represented by Formula (a-1), a compound represented by Formula (a-2), tetrahydrofurfuryl vinyl ether, and glycidyl vinyl ether. The monomer composition may contain each of them alone or in combination. Among them, the monomer composition according to the present invention preferably contains at least one of the compound represented by Formula (a-1) and the compound represented by Formula (a-2) for offering rapid curability. Formulae (a-1) and (a-2) are expressed as follows:

[Chem. 5]

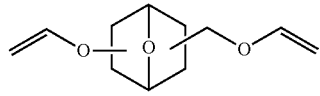
(a-1)

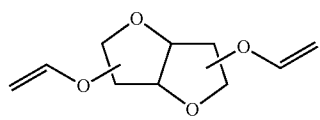
(a-2)

The vinyl ether compounds (a') having a chain hydrocarbon skeleton are represented typically by Formula (a'):

where R' is selected from a t-valent aliphatic hydrocarbon group and a t-valent group including two or more aliphatic hydrocarbon groups bonded to each other through a linkage group; and t represents an integer of 1 or more.

Non-limiting examples of a monovalent aliphatic hydrocarbon group include alkyl containing 1 to about 20 carbon atoms, such as methyl, ethyl, propyl, isopropyl, butyl, isobutyl, s-butyl, t-butyl, pentyl, hexyl, decyl, and dodecyl, of which alkyl containing 1 to about 10 carbon atoms is preferred, and alkyl containing 1 to about 3 carbon atoms is particularly preferred; alkenyl containing 2 to about 20 carbon atoms, such as vinyl, allyl, methallyl, 1-propenyl, isopropenyl, 1-butenyl, 2-butenyl, 3-butenyl, 1-pentenyl, 2-pentenyl, 3-pentenyl, 4-pentenyl, and 5-hexenyl, of which alkenyl containing 2 to about 10 carbon atoms is preferred, and alkenyl containing 2 or 3 carbon atoms is particularly preferred; and alkynyl containing 2 to about 20 carbon atoms, such as ethynyl and propynyl, of which alkynyl containing 2 to about 10 carbon atoms is preferred, and alkynyl containing 2 or 3 carbon atoms is particularly preferred. A non-limiting example of the t-valent aliphatic hydrocarbon group is a group resulting from removing "t−1" hydrogen atom(s) from the structural formula of the monovalent aliphatic hydrocarbon group.

The aliphatic hydrocarbon group may have one or more of a variety of substituents. Non-limiting examples of the substituents include halogen, oxo, hydroxy, substituted oxy (such as alkoxy, aryloxy, aralkyloxy, and acyloxy), carboxy, substituted oxycarbonyl (such as alkoxycarbonyl, aryloxycarbonyl, and aralkyloxycarbonyl), substituted or unsubstituted carbamoyl, cyano, nitro, substituted or unsubstituted amino, sulfo, and heterocyclic groups. The hydroxy and carboxy may each be protected with a protecting group which is commonly used in the field of organic synthesis.

Non-limiting examples of the linkage group include carbonyl (—CO—), ether bond (—O—), thioether bond (—S—), ester bond (—COO—), amido bond (—CONH—), and carbonate bond (—OCOO—).

The number t represents an integer of 1 or more and is typically 1 to 10.

Non-limiting examples of the vinyl ether compounds (a') having a chain hydrocarbon skeleton include methyl vinyl ether, ethyl vinyl ether, n-propyl vinyl ether, allyl vinyl ether, isopropyl vinyl ether, n-butyl vinyl ether, isobutyl vinyl ether, tert-butyl vinyl ether, n-pentyl vinyl ether, isopentyl vinyl ether, tert-pentyl vinyl ether, n-hexyl vinyl ether, isohexyl vinyl ether, 2-ethylhexyl vinyl ether, n-heptyl vinyl ether, n-octyl vinyl ether, nonyl vinyl ether, decyl vinyl ether, dodecyl vinyl ether, hexadecyl vinyl ether, octadecyl vinyl ether, ethoxymethyl vinyl ether, 2-methoxyethyl vinyl ether, 2-ethoxyethyl vinyl ether, 2-butoxyethyl vinyl ether, acetoxymethyl vinyl ether, 2-acetoxyethyl vinyl ether, 3-acetoxypropyl vinyl ether, 4-acetoxybutyl vinyl ether, 4-ethoxybutyl vinyl ether, 2-(2-methoxyethoxy)ethyl vinyl ether, 3-hydroxypropyl vinyl ether, 4-hydroxybutyl vinyl ether, 5-hydroxypentyl vinyl ether, 6-hydroxyhexyl vinyl ether, diethylene glycol monovinyl ether, diethylene glycol methyl vinyl ether, diethylene glycol ethyl vinyl ether, triethylene glycol monovinyl ether, tetraethylene glycol monovinyl ether, polyethylene glycol monovinyl ethers, propylene glycol monovinyl ether, dipropylene glycol monovinyl ether, tripropylene glycol monovinyl ether, polypropylene glycol monovinyl ethers, trimethylolpropane monovinyl ether, ethylene-oxide-added trimethylolpropane monovinyl ether, pentaerythritol monovinyl ether, ethylene-oxide-added pentaerythritol monovinyl ether, diethylene glycol ethyl vinyl ether, triethylene glycol methyl vinyl ether, divinyl ether, ethylene glycol divinyl ether, diethylene glycol divinyl ether, triethylene glycol divinyl ether, tetraethylene glycol divinyl ether, polyethylene glycol divinyl ethers, propylene glycol divinyl ether, dipropylene glycol divinyl ether, tripropylene glycol divinyl ether, polypropylene glycol divinyl ethers, butanediol divinyl ethers, neopentyl glycol divinyl ether, hexanediol divinyl ethers, nonanediol divinyl ethers, trimethylolpropane divinyl ether, ethylene-oxide-added trimethylolpropane divinyl ether, pentaerythritol divinyl ether, ethylene-oxide-added pentaerythritol divinyl ether, trimethylolpropane trivinyl ether, ethylene-oxide-added trimethylolpropane trivinyl ether, pentaerythritol trivinyl ether, ethylene-oxide-added pentaerythritol trivinyl ether, pentaerythritol tetravinyl ether, ethylene-oxide-added pentaerythritol tetravinyl ether, ditrimethylolpropane tetravinyl ether, and dipentaerythritol hexavinyl ether. The monomer composition may include each of them alone or in combination.

The vinyl ether compounds (a") having a cyclic hydrocarbon skeleton may be represented typically by Formula (a"):

$$R''\text{—}(O\text{—}CH=CH_2)_u \qquad (a'')$$

where R" is selected from a u-valent alicyclic hydrocarbon group and a u-valent group including two or more alicyclic hydrocarbon groups bonded to each other through a single bond or a linkage group; and u represents an integer of 1 or more.

Non-limiting examples of alicyclic rings constituting the alicyclic hydrocarbon groups include monocyclic hydrocarbon rings; and polycyclic hydrocarbon rings such as spiro hydrocarbon rings, hydrocarbon ring assemblies, bridged hydrocarbon rings, fused hydrocarbon rings, and bridged fused hydrocarbon rings. Non-limiting example of the u-valent alicyclic hydrocarbon group include groups resulting from removing "u" hydrogen atom(s) each from the structural formulae of the alicyclic rings.

Non-limiting examples of the monocyclic hydrocarbon rings include $C_5$-$C_{12}$ cycloalkane rings such as cyclopentane, cyclohexane, cycloheptane, and cyclooctane rings; and $C_5$-$C_{12}$ cycloalkene rings such as cyclohexene ring.

Non-limiting examples of the spiro hydrocarbon rings include $C_5$-$C_{16}$ spiro hydrocarbon rings such as spiro[4.4]nonane, spiro[4.5]decane, and spirobicyclohexane rings.

Non-limiting examples of the hydrocarbon ring assemblies include bicyclohexane and other hydrocarbon ring assemblies each including two or more of $C_5$-$C_{12}$ cycloalkane rings.

Non-limiting examples of the bridged hydrocarbon rings include bicyclic hydrocarbon rings such as pinane, bornane, norpinane, norbornane, norbornene, and bicyclooctane rings (such as bicyclo[2.2.2]octane and bicyclo[3.2.1]octane rings); tricyclic hydrocarbon rings such as homobledane, adamantane, tricyclo[5.2.1.0$^{2,6}$]decane, and tricyclo[4.3.1.1$^{2,5}$]undecane rings; and tetracyclic hydrocarbon rings such as tetracyclo[4.4.0.1$^{2,5}$.1$^{7,10}$]dodecane and perhydro-1,4-methano-5,8-methanonaphthalene rings.

Non-limiting examples of the fused hydrocarbon rings include fused rings each including two or more 5- to 8-membered cycloalkane rings fused to each other, such as perhydronaphthalene (decahydronaphthalene), perhydroanthracene, perhydrophenanthrene, perhydroacenaphthene, perhydrofluorene, perhydroindene, and perhydrophenalene rings.

Non-limiting examples of the bridged fused hydrocarbon rings include dimers of dienes, including dimers of cycloalkadienes such as cyclopentadiene, cyclohexadiene, and cycloheptadiene; and hydrogenated derivatives of them.

The alicyclic hydrocarbon group may have one or more substituents. Examples of the substituents are as with the substituents which R' in Formula (a-2) may have.

Non-limiting examples of the linkage group include divalent hydrocarbon groups, carbonyl (—CO—), ether bond (—O—), thioether bond (—S—), ester bond (—COO—), amido bond (—CONH—), and carbonate bond (—OCOO—). Examples of the divalent hydrocarbon groups are as with X in Formula (c) as described below.

The number u represents an integer of 1 or more and is typically 1 to 10.

Examples of the vinyl ether compounds (a") having a cyclic hydrocarbon skeleton include divinyl ether compounds (a"-1) having a cyclic hydrocarbon skeleton, such as compounds represented by Formula (a"-1); and monovinyl ether compounds (a"-2) having a cyclic hydrocarbon skeleton, such as 4-hydroxycyclohexyl vinyl ether, cyclohexyldimethanol monovinyl ether, cyclohexyl vinyl ether, cyclohexylmethyl vinyl ether, cyclohexylethyl vinyl ether, menthyl vinyl ether, norbornenyl vinyl ether, 1-adamantyl vinyl ether, and 2-adamantyl vinyl ether. Concrete, but non-limiting examples of the compounds represented by Formula (a"-1) include cyclohexanedimethanol divinyl ether, cyclohexanediol divinyl ethers, hydrogenated bisphenol-F divinyl ether, hydrogenated biphenyl divinyl ether, hydrogenated bisphenol-A divinyl ether, and tricyclodecanedimethanol divinyl ether. The monomer composition may contain each of them alone or in combination. Formula (a"-1) is expressed as follows:

[Chem. 6]

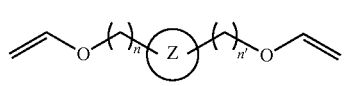

(a"-1)

where Ring Z is a ring selected from rings represented by Formulae (z-1) to (z-5); and n and n' represent, identically or differently, an integer of 0 or more, where Formulae (z-1) to (z-5) are expressed as follows:

[Chem. 7]

(z-1)

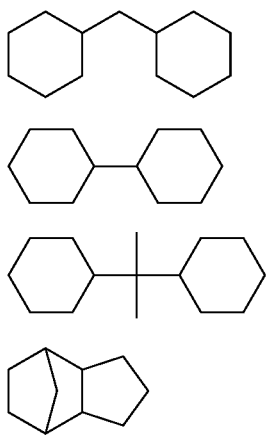

(z-2)
(z-3)
(z-4)
(z-5)

In Formula (a"-1), n and n' each represent, identically or differently, an integer of 0 or more and are each preferably an integer of 0 to 10, and particularly preferably an integer of preferably 0 to 3.

The vinyl ether compounds (a") having a cyclic hydrocarbon skeleton may also be selected from commercial products available typically under the trade names CHDVE (from Nippon Carbide Industries, Co., Inc.) and 4CH-DVE (from Daicel Corporation).

Such vinyl ether compounds can be produced using known methods for producing vinyl ether compounds. For example, the compound represented by Formula (a-1) can be produced typically by reacting 2-hydroxy-6-hydroxymethyloxabicyclo[2.2.1]heptane and a vinyl ester compound (such as vinyl propionate) with each other in the presence of a transition metal compound. The compound represented by Formula (a-2) can be produced typically by a procedure similar to the above procedure, except for using isosorbide instead of 2-hydroxy-6-hydroxymethyloxabicyclo[2.2.1]heptane.

Oxetane Compound (B)

Oxetane compounds are cationically polymerizable monomers containing an oxetanyl group, which group serves as a polymerizable group. The oxetane compounds include monofunctional oxetane compounds and multifunctional oxetane compounds. The monomer composition may contain each of different oxetane compounds alone or in combination.

Non-limiting examples of the oxetane compounds include compounds represented by Formula (b):

[Chem. 8]

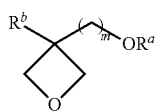

(b)

where $R^a$ represents a monovalent organic group; $R^b$ is selected from hydrogen and ethyl; and m represents an integer of 0 or more.

The "monovalent organic group" as $R^a$ includes monovalent hydrocarbon groups, monovalent heterocyclic groups, substituted oxycarbonyl (such as alkoxycarbonyl, aryloxycarbonyl, aralkyloxycarbonyl, and cycloalkyloxycarbonyl), substituted carbamoyl (such as N-alkylcarbamoyl and N-arylcarbamoyl), acyl (including aliphatic acyl such as acetyl; and aromatic acyl such as benzoyl), and monovalent groups each including two or more of these groups bonded to each other through a single bond or a linkage group.

The monovalent hydrocarbon groups include monovalent aliphatic hydrocarbon groups, monovalent alicyclic hydrocarbon groups, and monovalent aromatic hydrocarbon groups.

Examples of the monovalent aliphatic hydrocarbon groups are as with the monovalent groups as R' in Formula (a'). Examples of the monovalent alicyclic hydrocarbon groups are as with the monovalent groups as R" in Formula (a").

Non-limiting examples of the monovalent aromatic hydrocarbon groups include aromatic hydrocarbon groups containing about 6 to about 14 carbon atoms, such as phenyl and naphthyl, of which those containing about 6 to about 10 carbon atoms are preferred.

The monovalent hydrocarbon groups may each have one or more substituents. Examples of the substituents are as with the substituents which R' in Formula (a') may have.

Non-limiting examples of heterocyclic rings constituting the heterocyclic groups include oxygen-containing heterocyclic rings, sulfur-containing heterocyclic rings, and nitrogen-containing heterocyclic rings, where oxygen, sulfur, and nitrogen each serve as a heteroatom. Non-limiting examples of the oxygen-containing heterocyclic rings include 4-membered rings such as oxetane ring; 5-membered rings such as furan, tetrahydrofuran, oxazole, isoxazole, and γ-butyrolactone rings; 6-membered rings such as 4-oxo-4H-pyran, tetrahydropyran, and morpholine rings; fused rings such as benzofuran, isobenzofuran, 4-oxo-4H-chromene, chroman, and isochroman rings; and bridged rings such as 3-oxatricyclo[4.3.1.1$^{4,8}$]undecan-2-one and 3-oxatricyclo[4.2.1.0$^{4,8}$]nonan-2-one rings. Non-limiting examples of the sulfur-containing heterocyclic rings include 5-membered rings such as thiophene, thiazole, isothiazole, and thiadiazole rings; 6-membered rings such as 4-oxo-4H-thiopyran rings; and fused rings such as benzothiophene ring. Non-limiting examples of the nitrogen-containing heterocyclic rings include 5-membered rings such as pyrrole, pyrrolidine, pyrazole, imidazole, and triazole rings; 6-membered rings such as pyridine, pyridazine, pyrimidine, pyrazine, piperidine, and piperazine rings; and fused rings such as indole, indoline, quinoline, acridine, naphthyridine, quinazoline, and purine rings. Non-limiting examples of the monovalent heterocyclic groups include groups resulting from removing one hydrogen atom each from the structural formulae of the heterocyclic rings.

The heterocyclic groups may each have one or more substituents. Examples of the substituents include the substituents which the hydrocarbon groups may have; as well as alkyl (such as methyl, ethyl, and other $C_1$-$C_4$ alkyl), cycloalkyl, and aryl (such as phenyl and naphthyl).

Non-limiting examples of the linkage group include carbonyl (—CO—), ether bond (—O—), thioether bond (—S—), ester bond (—COO—), amido bond (—CONH—), carbonate bond (—OCOO—), silyl bond (—Si—), and groups each including two or more of them linked to each other.

The number m represents an integer of 1 or more and is typically 1 to 20, and preferably 1.

Of the compounds represented by Formula (b), preferred are compounds represented by Formula (b'). In the formula, $R^c$ represents a monovalent hydrocarbon group and may be exemplified as with the monovalent hydrocarbon group as R$^a$. Formula (b') is expressed as follows:

[Chem. 9]

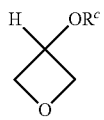

(b')

Concrete, but non-limiting examples of the compounds represented by Formula (b') include 3-methoxyoxetane, 3-ethoxyoxetane, 3-propoxyoxetane, 3-isopropoxyoxetane, 3-(n-butoxy)oxetane, 3-isobutoxyoxetane, 3-(s-butoxy)oxetane, 3-(t-butoxy)oxetane, 3-pentyloxyoxetane, 3-hexyloxyoxetane, 3-(2-ethylhexyloxy)oxetane, 3-heptyloxyoxetane, 3-octyloxyoxetane, 3-(1-propenyloxy)oxetane, 3-cyclohexyloxyoxetane, 3-(4-methylcyclohexyloxy)oxetane, 3-[(2-perfluorobutyl)ethoxy]oxetane, 3-phenoxyoxetane, 3-(4-methylphenoxy)oxetane, 3-(3-chloro-1-propoxy)oxetane, 3-(3-bromo-1-propoxy)oxetane, 3-(4-fluorophenoxy)oxetane, and 3-allyloxyoxetane.

Non-limiting examples of the compounds represented by Formula (b) also include compounds represented by Formulae (b-1) to (b-13):

[Chem. 10]

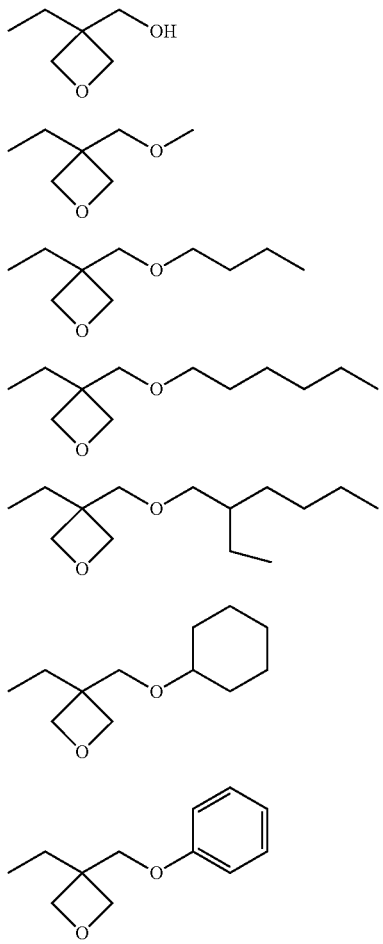

(b-1)
(b-2)
(b-3)
(b-4)
(b-5)
(b-6)
(b-7)

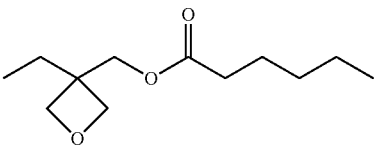
(b-8)

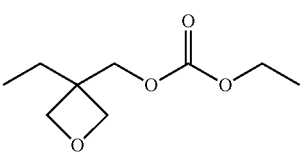
(b-9)

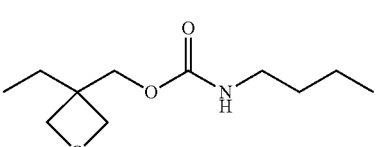
(b-10)

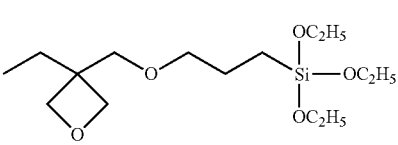
(b-11)

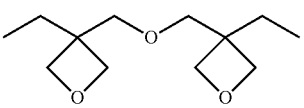
(b-12)

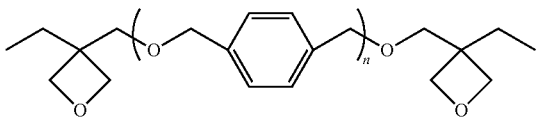
(b-13)

n = 1~3

The oxetane compounds may also be selected from commercial products available typically as ARON OXETANE OXT-101, ARON OXETANE OXT-121, ARON OXETANE OXT-212, ARON OXETANE OXT-211, ARON OXETANE OXT-213, ARON OXETANE OXT-221, and ARON OXETANE OXT-610 (each from Toagosei Co., Ltd.).

Epoxy Compound (C)

In an embodiment, the monomer composition according to the present invention contains an epoxy compound (C), which serves as a cationically polymerizable monomer. Non-limiting examples of the epoxy compound (C) include aromatic glycidyl ether epoxy compounds; alicyclic glycidyl ether epoxy compounds such as hydrogenated bisphenol-A diglycidyl ether; aliphatic glycidyl ether epoxy compounds; glycidyl ester epoxy compounds; glycidylamine epoxy compounds; epoxy compounds containing a cyclohexene oxide group; and epoxy-modified siloxane compounds, where the epoxy compounds containing a cyclohexene oxide group are hereinafter also referred to as "cycloaliphatic epoxy compounds". The monomer composition may contain each of different epoxy compounds alone or in combination.

As the epoxy compound (C) for use in the present invention, the monomer composition preferably contains a cycloaliphatic epoxy compound. This is preferred because the resulting monomer composition can form a cured product having excellent substrate adhesion and, particularly when used for an inkjet ink, can give a cured product as a print that is resistant to scratch and can maintain its beauty over a long time. In particular, the epoxy compound (C) may include such a cycloaliphatic epoxy compound in an amount of preferably 30 weight percent or more, more preferably 50 weight percent or more, and particularly preferably 80 weight percent or more, of the total weight of all epoxy compounds contained in the monomer composition.

Non-limiting examples of the cycloaliphatic epoxy compound include compounds represented by Formula (c):

[Chem. 11]

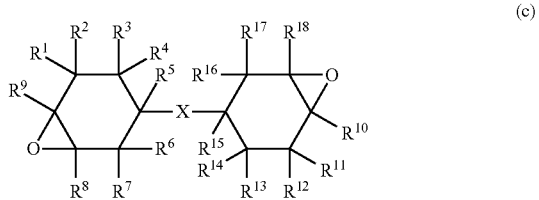

(c)

In Formula (c), $R^1$ to $R^{18}$ are each, identically or differently, selected from hydrogen, halogen, a hydrocarbon group optionally containing oxygen or halogen, and optionally substituted alkoxy.

Non-limiting examples of the halogen as $R^1$ to $R^{18}$ include fluorine, chlorine, bromine, and iodine.

Examples of the hydrocarbon group as $R^1$ to $R^{18}$ are as with $R^c$ in Formula (b').

Non-limiting examples of the hydrocarbon group optionally containing oxygen or halogen, as $R^1$ to $R^{18}$, include groups corresponding to the above-mentioned hydrocarbon groups, except with an oxygen-containing group or a halogen atom replacing at least one hydrogen atom each of the hydrocarbon groups. Non-limiting examples of the oxygen-containing group include hydroxy; hydroperoxy; $C_1$-$C_{10}$ alkoxy such as methoxy, ethoxy, propoxy, isopropyloxy, butoxy, and isobutyloxy; $C_2$-$C_{10}$ alkenyloxy such as allyloxy; tolyloxy, naphthyloxy, and other $C_6$-$C_{14}$ aryloxy optionally having one or more substituents selected from $C_1$-$C_{10}$ alkyl, $C_2$-$C_{10}$ alkenyl, halogen, and $C_1$-$C_{10}$ alkoxy; $C_7$-$C_{18}$ aralkyloxy such as benzyloxy and phenethyloxy; $C_1$-$C_{10}$ acyloxy such as acetyloxy, propionyloxy, (meth) acryloyloxy, and benzoyloxy; $C_1$-$C_{10}$ alkoxycarbonyl such as methoxycarbonyl, ethoxycarbonyl, propoxycarbonyl, and butoxycarbonyl; phenoxycarbonyl, tolyloxycarbonyl, naphthyloxycarbonyl, and other $C_6$-$C_{14}$ aryloxycarbonyl optionally having one or more substituents selected from $C_1$-$C_{10}$ alkyl, $C_2$-$C_{10}$ alkenyl, halogen, and $C_1$-$C_{10}$ alkoxy; $C_7$-$C_{18}$ aralkyloxycarbonyl such as benzyloxycarbonyl; epoxy-containing groups such as glycidyloxy; oxetanyl-containing groups such as ethyloxetanyloxy; $C_1$-$C_{10}$ acyl such as acetyl, propionyl, and benzoyl; isocyanato; sulfo; carbamoyl; oxo; and groups each including two or more of these groups bonded through a single bond or a linkage group such as $C_1$-$C_{10}$ alkylene.

Non-limiting examples of the alkoxy as $R^1$ to $R^{18}$ include $C_1$-$C_{10}$ alkoxy such as methoxy, ethoxy, propoxy, isopropyloxy, butoxy, and isobutyloxy.

Non-limiting examples of the substituents which the alkoxy may have include halogen, hydroxy, $C_1$-$C_{10}$ alkoxy, $C_2$-$C_{10}$ alkenyloxy, $C_6$-$C_{14}$ aryloxy, $C_1$-$C_{10}$ acyloxy, mercapto, $C_1$-$C_{10}$ alkylthio, $C_2$-$C_{10}$ alkenylthio, $C_6$-$C_{14}$ arylthio, $C_7$-$C_{18}$ aralkylthio, carboxy, $C_1$-$C_{10}$ alkoxycarbonyl, $C_6$-$C_{14}$ aryloxycarbonyl, $C_7$-$C_{18}$ aralkyloxycarbonyl, amino, mono- or di-($C_1$-$C_{10}$ alkyl)amino, $C_1$-$C_{10}$ acylamino, epoxy-containing groups, oxetanyl-containing groups, $C_1$-$C_{10}$ acyl, oxo, and groups each including two or more of them bonded to each other through a single bond or a linkage group such as $C_1$-$C_{10}$ alkylene.

In Formula (c), X is selected from a single bond and a linkage group. Non-limiting examples of the linkage group include divalent hydrocarbon groups, alkenylene with part or all of carbon-carbon double bond(s) being epoxidized, carbonyl (—CO—), ether bond (—O—), ester bond (—COO—), carbonate (—O—CO—O—), amido (—CONH—), and groups each including two or more of these groups linked to each other.

Non-limiting examples of the divalent hydrocarbon groups include $C_1$-$C_{18}$ linear or branched alkylene and $C_3$-$C_{18}$ divalent alicyclic hydrocarbon groups. Non-limiting examples of the $C_1$-$C_{18}$ linear or branched alkylene include methylene, methylmethylene, dimethylmethylene, ethylene, propylene, and trimethylene. Non-limiting examples of the $C_3$-$C_{18}$ divalent alicyclic hydrocarbon groups include cycloalkylene (including cycloalkylidene), such as 1,2-cyclopentylene, 1,3-cyclopentylene, cyclopentylidene, 1,2-cyclohexylene, 1,3-cyclohexylene, 1,4-cyclohexylene, and cyclohexylidene.

The alkenylene with part or all of carbon-carbon double bond(s) being epoxidized is hereinafter also referred to as "epoxidized alkenylene". Non-limiting examples of the alkenylene moiety in the epoxidized alkenylene include $C_2$-$C_8$ linear or branched alkenylene such as vinylene, propenylene, 1-butenylene, 2-butenylene, butadienylene, pentenylene, hexenylene, heptenylene, and octenylene. Of the epoxidized alkenylene groups, preferred are alkenylene groups with all carbon-carbon double bond(s) being epoxidized, and more preferred are $C_2$-$C_4$ alkenylene groups with all the carbon-carbon double bond(s) being epoxidized.

Representative, but non-limiting examples of the compounds represented by Formula (c) include (3,4,3',4'-diepoxy)bicyclohexyl, bis(3,4-epoxycyclohexylmethyl) ether, 1,2-epoxy-1,2-bis(3,4-epoxycyclohex-1-yl)ethane, 2,2-bis(3,4-epoxycyclohex-1-yl)propane, 1,2-bis(3,4-epoxycyclohex-1-yl)ethane, and compounds represented by Formulae (c-1) to (c-8). In Formulae (c-5) and (c-7), $n^1$ and $n^2$ each independently represent an integer of 1 to 30. In Formula (c-5), L is $C_1$-$C_8$ linear or branched alkylene. Formulae (c-1) to (c-8) are expressed as follows:

[Chem. 12]

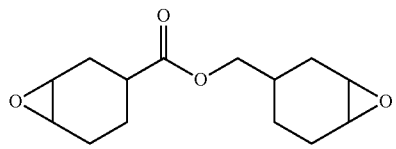

(c-1)

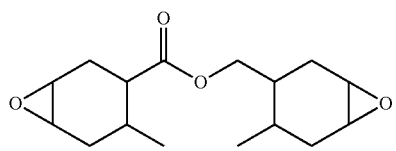

(c-2)

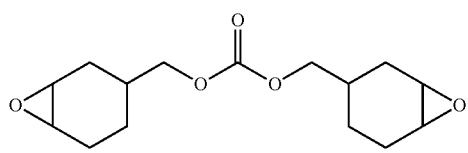

(c-3)

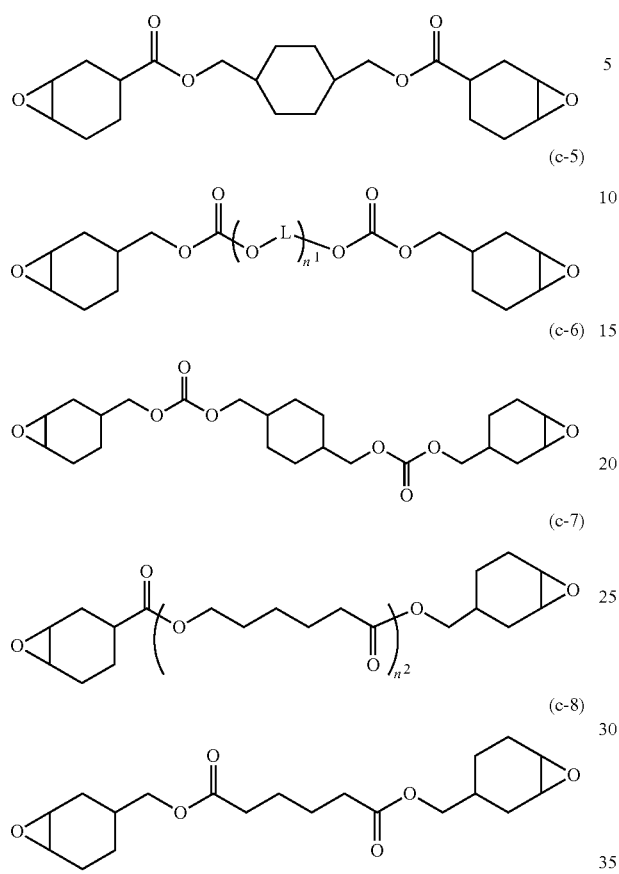

In addition to the compounds represented by Formula (c), the cycloaliphatic epoxy compounds also include compounds containing an alicyclic ring and two or more epoxy groups in the molecule, where one of the two or more epoxy groups is a cyclohexene oxide group. These compounds are exemplified by 1,2:8,9-diepoxylimonene represented by Formula (c-9):

[Chem. 13]

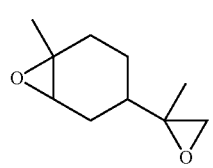

In addition, the cycloaliphatic epoxy compounds also include cycloaliphatic epoxy compounds each containing three or more cyclohexene oxide groups, as represented by Formulae (c-10) and (c-11) below; and cycloaliphatic epoxy compounds each containing one cyclohexene oxide group, but being devoid of other epoxy groups, as represented by Formulae (c-12) to (c-15) below. In Formulae (c-10) and (c-11), $n^3$ to $n^8$ each represent, identically or differently, an integer of 1 to 30. In Formula (c-14), $R^{19}$ and $R^{20}$ each represent, identically or differently, $C_1$-$C_{31}$ linear or branched alkyl. Formulae (c-10) to (c-15) are expressed as follows:

[Chem. 14]

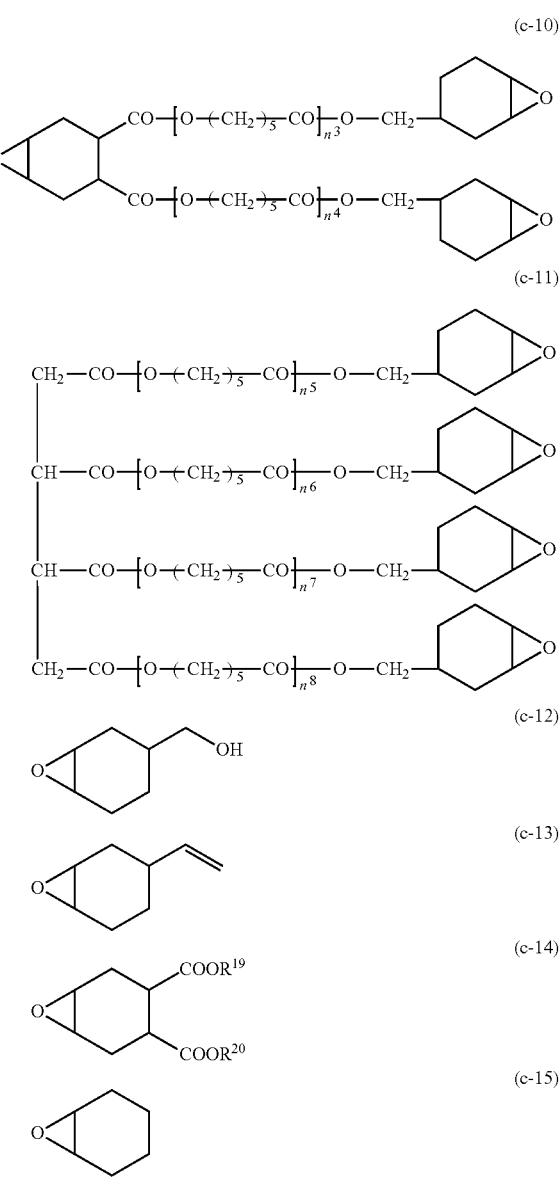

As the epoxy compound (C) for use in the present invention, the monomer composition preferably contains the compound represented by Formula (c) and containing two cyclohexene oxide groups per molecule, and particularly preferably contains 3,4-epoxycyclohexylmethyl (3,4-epoxy)cyclohexanecarboxylate represented by Formula (c-1). This is preferred, in particular, for excellent adhesion to the substrate (such as glass).

When desired to form a cured product having high surface hardness and satisfactory heat resistance, the monomer composition may contain an epoxy-modified siloxane compound as the epoxy compound (C).

Non-limiting examples of the epoxy-modified siloxane compound include epoxy-modified polyorganosilsesquioxanes and epoxy-modified silicones. The monomer composition may contain each of them alone or in combination.

Non-limiting examples of the epoxy-modified polyorganosilsesquioxanes include compounds containing any of constitutional units represented by Formula (c-16) and constitutional units represented by Formula (c-17), where the compounds include compounds having any of random structures, cage-like structures, and ladder-like structures.

[Chem. 15]

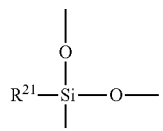
(c-16)

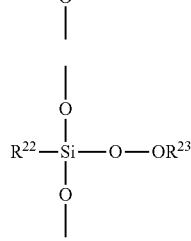
(c-17)

The epoxy-modified silicones include compounds of any of a cyclic structure and a chain structure. The epoxy-modified silicones having a cyclic structure are represented typically by Formula (c-18). The epoxy-modified silicones having a chain structure are represented typically by Formula (c-19):

[Chem. 16]

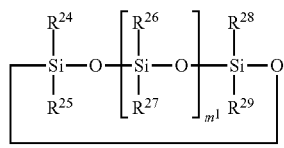
(c-18)

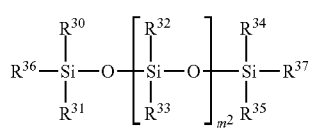
(c-19)

In the formulae, $R^{21}$ to $R^{37}$ are, identically or differently in each occurrence, selected from hydrogen and a hydrocarbon group optionally containing an oxirane ring. Examples of the hydrocarbon group are as with $R^c$ in Formula (b'). The numbers $m^1$ in Formula (c-18) and $m^2$ in Formula (c-19) each represent, identically or differently, an integer of 1 or more. When $m^1$ is an integer of 2 or more, "$m^1$" occurrences of $R^{26}$ and "$m^1$" occurrences of $R^{27}$ in (c-18) may each be identical or different. When $m^2$ is an integer of 2 or more, "$m^2$" occurrences of $R^{32}$ and "$m^2$" occurrences of $R^{33}$ in (c-19) may each be identical or different. However, at least one of $R^{21}$ to $R^{23}$ in the polyorganosilsesquioxanes, at least one of $R^{24}$ to $R^{29}$ in the silicones having a cyclic structure, and at least one of $R^{30}$ to $R^{37}$ in the silicones having a chain structure are each independently an oxirane-ring-containing hydrocarbon group. Non-limiting examples of the oxirane-ring-containing hydrocarbon group include hydrocarbon groups containing a cyclohexene oxide group; and hydrocarbon groups containing a glycidyl group.

The epoxy-modified siloxane compound(s) may be present in a content of typically 1 to 100 weight percent of the total weight of all epoxy compounds contained in the monomer composition. The upper limit of the content is preferably 80 weight percent, and particularly preferably 70 weight percent, and most preferably 60 weight percent. The lower limit of the content is preferably 5 weight percent, particularly preferably 10 weight percent, and most preferably 20 weight percent.

Monomer Composition

The monomer compositions according to the present invention are monomer compositions containing the vinyl ether compound (A). The monomer compositions contain, as the vinyl ether compound (A), a vinyl ether compound (a) having a cyclic ether skeleton. The monomer compositions further contain at least one compound selected from the group consisting of a vinyl ether compound (a') having a chain hydrocarbon skeleton, a divinyl ether compound (a''-1) having a cyclic hydrocarbon skeleton, an oxetane compound (B), and an epoxy compound (C).

The monomer compositions according to the present invention include monomer compositions according to embodiments (1) to (6) as follows.

(1) The monomer composition according to the embodiment (1) is a monomer composition containing the vinyl ether compound (A), the oxetane compound (B), and the epoxy compound (C). The vinyl ether compound (A) includes at least one of a compound represented by Formula (a-1) and a compound represented by Formula (a-2). The oxetane compound (B) includes 3-ethyl-3-((2-ethylhexyloxy)methyl)oxetane. The at least one of the compound represented by Formula (a-1) and the compound represented by Formula (a-2) is present in a content of from 5 weight percent to less than 30 weight percent of the total weight of the monomer composition. This monomer composition is hereinafter also referred to as a "monomer composition (Type 1)".

(2) The adhesive composition according to the embodiment (2) is a monomer composition containing the vinyl ether compound (A) and the oxetane compound (B). The vinyl ether compound (A) includes at least one of the compound represented by Formula (a-1) and the compound represented by Formula (a-2). The oxetane compound (B) includes a compound represented by Formula (b'). This monomer composition is hereinafter also referred to as a "monomer composition (Type 2)".

(3) The monomer composition according to the embodiment (3) is a monomer composition containing the vinyl ether compound (A) and the epoxy compound (C). The vinyl ether compound (A) includes at least one of the compound represented by Formula (a-1) and the compound represented by Formula (a-2) in an amount of from 5 weight percent to less than 30 weight percent of the total weight of the monomer composition. The epoxy compound (C) includes 1,2:8,9-diepoxylimonene in an amount of greater than 40 weight percent of the total weight of the monomer composition. This monomer composition is hereinafter also referred to as a "monomer composition (Type 3)".

(4) The monomer composition according to the embodiment (4) is a monomer composition containing the vinyl ether compound (A), the oxetane compound (B), and the epoxy compound (C). The vinyl ether compound (A) includes at least one of the compound represented by Formula (a-1) and the compound represented by Formula (a-2) in an amount of from 5 weight percent to less than 30 weight percent of the total weight of the monomer composition. The oxetane compound (B) includes a monofunctional oxetane compound in an amount of 10 to 85 weight percent of the total weight of the monomer composition, where the monofunctional oxetane compound includes 3-ethyl-3-((2-ethylhexyloxy)methyl)oxetane. The epoxy compound (C) includes 1,2:8,9-diepoxylimonene in an amount of 10 to 40 weight percent of the total weight of the monomer composition. This monomer composition is hereinafter also referred to as a "monomer composition (Type 4)".

(5) The monomer composition according to the embodiment (5) is a monomer composition containing the vinyl ether compound (A) and the oxetane compound (B). The vinyl ether compound (A) includes at least one of the compound represented by Formula (a-1) and the compound represented by Formula (a-2), and the divinyl ether compound (a"-1) having a cyclic hydrocarbon skeleton. The oxetane compound (B) includes a monofunctional oxetane compound. This monomer composition is hereinafter also referred to as a "monomer composition (Type 5)".

(6) The monomer composition according to the embodiment (6) is a monomer composition containing the vinyl ether compound (A). The monomer composition contains a monofunctional monomer or monomers in an amount of 20 to 70 weight percent of the total weight of the monomer composition. The monomer composition contains the vinyl ether compound (a) having a cyclic ether skeleton and the vinyl ether compound (a') having a chain hydrocarbon skeleton in a total amount of 10 to 40 weight percent of the total weight of the monomer composition. The vinyl ether compound (a) having a cyclic ether skeleton is present in a content of from 5 weight percent to less than 30 weight percent of the total weight of the monomer composition. This monomer composition is hereinafter also referred to as a "monomer composition (Type 6)".

Monomer Composition (Type 1)

The monomer composition (Type 1) contains, as a cationically polymerizable monomer, the vinyl ether compound (A), where the vinyl ether compound (A) includes at least one of the compound represented by Formula (a-1) and the compound represented by Formula (a-2). The monomer composition may further contain any of other vinyl ether compounds, in addition to the at least one of the compound represented by Formula (a-1) and the compound represented by Formula (a-2). However, the proportion of the at least one of the compound represented by Formula (a-1) and the compound represented by Formula (a-2) in all vinyl ether compounds contained in the monomer composition is typically 50 weight percent or more, preferably 70 weight percent or more, and particularly preferably 85 weight percent or more.

The at least one of the compound represented by Formula (a-1) and the compound represented by Formula (a-2) may be present in a content of from 5 weight percent to less than 30 weight percent, preferably from 10 weight percent to less than 30 weight percent, and particularly preferably 10 to 25 weight percent, of the total weight of the monomer composition (the total weight of all cationically polymerizable monomers contained in the monomer composition). When both the two compounds are present, the term "content" refers to the total content of them. Assume that the monomer composition contains the at least one of the compound represented by Formula (a-1) and the compound represented by Formula (a-2) in a content greater than the range. Disadvantageously, this monomer composition, when incorporated with a photoacid generator, may give a curable composition that has a significantly lowered curing rate and is hardly cured in the presence of water. In contrast, assume that the monomer composition contains the at least one of the compound represented by Formula (a-1) and the compound represented by Formula (a-2) in a content less than the range. Disadvantageously, this monomer composition may fail to offer rapid curability.

The monomer composition (Type 1) contains 3-ethyl-3-[(2-ethylhexyloxy)methyl]oxetane as the oxetane compound (B). The monomer composition may further contain any of other oxetane compounds. However, the proportion of 3-ethyl-3-[(2-ethylhexyloxy)methyl]oxetane is typically 50 weight percent or more, preferably 70 weight percent or more, and particularly preferably 85 weight percent or more, of the total weight of all oxetane compounds contained in the monomer composition.

The 3-ethyl-3-[(2-ethylhexyloxy)methyl]oxetane is present in a content of typically 5 to 80 weight percent, preferably 10 to 70 weight percent, and particularly preferably 20 to 60 weight percent of the total weight of the monomer composition (the total weight of all cationically polymerizable monomers contained in the monomer composition). The monomer composition, when containing 3-ethyl-3-[(2-ethylhexyloxy)methyl]oxetane in a content within the range and when incorporated with a photoacid generator, gives a curable composition that can be rapidly cured upon ultraviolet irradiation, even in the presence of water, to form a cured product having excellent substrate adhesion. In contrast, the monomer composition, if containing 3-ethyl-3-[(2-ethylhexyloxy)methyl]oxetane in a content greater than the range, tends to less satisfactorily offer rapid curability; and the monomer composition, if containing 3-ethyl-3-[(2-ethylhexyloxy)methyl]oxetane in a content less than the range, tends to offer lower substrate adhesion.

The monomer composition (Type 1) preferably contains the epoxy compound (C), where the epoxy compound (C) includes an epoxy compound containing a cyclohexene oxide group. The epoxy compound (C) may be present in a content of typically 5 to 80 weight percent, preferably 10 to 70 weight percent, and particularly preferably 20 to 60 weight percent, of the total weight of the monomer composition (the total weight of all cationically polymerizable monomers contained in the monomer composition). The monomer composition, when containing the epoxy compound (C) in a content within the range and when incorporated with a photoacid generator, gives a curable composition that can be rapidly cured upon ultraviolet irradiation, even in the presence of water, to form a cured product having excellent substance adhesion. In contrast, the monomer composition, if containing the epoxy compound (C) in a content greater than the range, tends to less satisfactorily offer rapid curability; and the monomer composition, if containing the epoxy compound (C) in a content less than the range, tends to have a significantly lowered curing rate and to be hardly cured in the presence of water. In addition, the monomer composition in this case also tends to give a cured product that has lower substrate adhesion.

Monomer Composition (Type 2)

The monomer composition (Type 2) contains, as a cationically polymerizable monomer, the vinyl ether compound (A) including at least one of the compound represented by Formula (a-1) and the compound represented by Formula (a-2). The monomer composition (Type 2) may further contain any of other vinyl ether compounds, in addition to the at least one of the compound represented by Formula (a-1) and the compound represented by Formula (a-2). However, the proportion of the at least one of the compound represented by Formula (a-1) and the compound represented by Formula (a-2) is typically 30 weight percent or more, preferably 50 weight percent or more, and particularly preferably 80 weight percent or more, of the total weight of all vinyl ether compounds contained in the monomer composition.

The at least one of the compound represented by Formula (a-1) and the compound represented by Formula (a-2) may be present in a content of typically from about 5 weight percent to less than about 30 weight percent, preferably 5 to 25 weight percent, and particularly preferably 10 to 25 weight percent, of the total weight of the monomer composition (the total weight of all cationically curable monomers contained in the monomer composition). When both the two compounds are present, the term "content" refers to the total content of them. The monomer composition, when containing the at least one of the compound represented by Formula (a-1) and the compound represented by Formula (a-2) in a content within the range and when incorporated with a photoacid generator, gives a curable composition that can be rapidly cured, even in the presence of water, to give a cured product having excellent substrate adhesion. In contrast, the monomer composition, if containing the at least one of the compound represented by Formula (a-1) and the compound represented by Formula (a-2) in a content greater than the range, tends to be cured at a lower curing rate in the presence of water. The monomer composition, if containing the at least one of the compound represented by Formula (a-1) and the compound represented by Formula (a-2) in a content less than the range, tends to less satisfactorily offer rapid curability.

All the vinyl ether compounds (A) including at least one of the compound represented by Formula (a-1) and the compound represented by Formula (a-2) may be present in a content (total content) of typically about 5 to about 80 weight percent, preferably 10 to 70 weight percent, and particularly preferably 20 to 60 weight percent, of the total weight of the monomer composition (the total weight of all cationically curable monomers contained in the monomer composition).

The monomer composition (Type 2) contains a compound represented by Formula (b') as the oxetane compound (B). Of such compounds represented by Formula (b'), at least one of 3-allyloxyoxetane and 3-(2-ethylhexyloxy)oxetane is particularly preferred.

The monomer composition may further contain any of oxetane compounds other than the compounds represented by Formula (b'). However, the proportion of the compounds represented by Formula (b') (in particular, at least one of 3-allyloxyoxetane and 3-(2-ethylhexyloxy)oxetane) is typically 10 weight percent or more, preferably 40 weight percent or more, and particularly preferably 70 weight percent or more, of the total weight of all oxetane compounds contained in the monomer composition. When the monomer composition contains two or more different compounds represented by Formula (b'), the "proportion" refers to the total proportion of them. The monomer composition, if containing the compounds represented by Formula (b') in a proportion less than the range, namely, if containing other oxetane compounds in a proportion greater than the range, tends to offer lower curability in the presence of water.

All the oxetane compounds (B) including the compound represented by Formula (b') may be present in a content (total content) of typically about 10 to about 70 weight percent, preferably 20 to 70 weight percent, and particularly preferably 30 to 60 weight percent, of the total weight of the monomer composition (the total weight of all cationically curable monomers contained in the monomer composition).

The compound represented by Formula (b') may be present in a content of typically about 5 to about 90 weight percent of the total weight of the monomer composition (the total weight of all cationically curable monomers contained in the monomer composition). When the monomer composition contains two or more different compounds represented by Formula (b'), the term "content" refers to the total content of them. The lower limit of the content is preferably 20 weight percent, more preferably 30 weight percent, particularly preferably 40 weight percent, and most preferably 45 weight percent. The upper limit of the content is preferably 80 weight percent and is, for excellent curability in the presence of water, particularly preferably 75 weight percent, more preferably 70 weight percent, and most preferably 60 weight percent. The monomer composition, when containing the compound(s) represented by Formula (b') in a content within the range and when incorporated with a photoacid generator, gives a curable composition that can be rapidly cured, even in the presence of water, to form a cured product having excellent substance adhesion.

The monomer composition (Type 2) may further contain the epoxy compound (C), where the epoxy compound (C) includes an epoxy compound containing a cyclohexene oxide group. The epoxy compound (C) (in particular, the cycloaliphatic epoxy compound) may be present in a content of typically 5 to 80 weight percent, preferably 10 to 70 weight percent, and particularly preferably 20 to 60 weight percent, of the total weight of the monomer composition (the total weight of all cationically curable monomers contained in the monomer composition). Advantageously, the monomer composition, when containing the epoxy compound (C) in a content within the range, gives a cured product that can be rapidly cured, even in the presence of water, to give a cured product having excellent substrate adhesion.

The total content of the vinyl ether compound (A) and the epoxy compound (C) may be typically 5 to 90 weight percent, preferably 10 to 80 weight percent, particularly preferably 20 to 80 weight percent, and most preferably 40 to 75 weight percent, of the total weight of the monomer composition (the total weight of all cationically curable monomers contained in the monomer composition). Advantageously, the monomer composition, when having a total content of the vinyl ether compound (A) and the epoxy compound (C) within the range, gives a curable composition that can be rapidly cured, even in the presence of water, to give a cured product having excellent substrate adhesion.

Monomer Composition (Type 3)

The monomer composition (Type 3) contains, as a cationically polymerizable monomer or monomers, the vinyl ether compound (A) including at least one of the compound represented by Formula (a-1) and the compound represented by Formula (a-2)

The at least one of the compound represented by Formula (a-1) and the compound represented by Formula (a-2) is present in a content of from 5 weight percent to less than 30 weight percent, preferably from 10 weight percent to less than 30 weight percent, and particularly preferably 10 to 25 weight percent, of the total weight of the monomer composition (the total weight of all monomers contained in the monomer composition). When both the two compounds are present, the term "content" refers to the total content of them. Assume that the monomer composition contains the at least one of the compound represented by Formula (a-1) and the compound represented by Formula (a-2) in a content greater than the range. Disadvantageously, this monomer composition, when incorporated with a photoacid generator, gives a curable composition that may be cured at a significantly lowered curing rate and may hardly be cured in the presence of water. In contrast, assume that the monomer composition contains the at least one of the compound represented by Formula (a-1) and the compound represented by Formula (a-2) in a content less than the range. Disadvantageously, this monomer composition may fail to offer rapid curability.

The monomer composition (Type 3) may further contain one or more of other vinyl ether compounds, in addition to the at least one of the compound represented by Formula (a-1) and the compound represented by Formula (a-2). Such other vinyl ether compounds may be present in a content of typically about 1 to about 50 weight percent, preferably 5 to 40 weight percent, and particularly preferably 10 to 30 weight percent, of the total weight of the monomer composition (the total weight of all monomers contained in the monomer composition). In particular, the monomer composition preferably contains at least one of the vinyl ether compound (a') having a chain hydrocarbon skeleton and the vinyl ether compound (a") having a cyclic hydrocarbon skeleton. This is preferred because the monomer composition can have rapid curability and form a cured product having excellent toughness. Examples of the vinyl ether compound (a') having a chain hydrocarbon skeleton include the compounds represented by Formula (a'), of which divinyl ether compounds are preferred. Examples of the vinyl ether compound (a") having a cyclic hydrocarbon skeleton include the compounds represented by Formula (a"), of which divinyl ether compounds are preferred. The at least one of the vinyl ether compound (a') having a chain hydrocarbon skeleton and the vinyl ether compound (a") having a cyclic hydrocarbon skeleton may be present in a total content of typically 10 to 70 weight percent, preferably 20 to 60 weight percent, and particularly preferably 30 to 50 weight percent, of the total weight of all vinyl ether compounds contained in the monomer composition.

The monomer composition (Type 3) may further contain, as a monomer, the oxetane compound (B), or not. When the monomer composition further contains the oxetane compound (B), the oxetane compound (B) may be selected from any of monofunctional oxetane compounds and multifunctional oxetane compounds. The oxetane compound (B) may be present in a content of about 50 weight percent or less, preferably 5 to 50 weight percent, and particularly preferably 5 to 20 weight percent, of the total weight of the monomer composition (the total weight of all monomers contained in the monomer composition).

The monomer composition (Type 3) contains 1,2:8,9-diepoxylimonene in an amount of greater than 40 weight percent, preferably from greater than 40 weight percent to 80 weight percent, particularly preferably from greater than 40 weight percent to 60 weight percent, and most preferably 45 to 60 weight percent, of the total weight of the monomer composition (the total weight of all monomers contained in the monomer composition).

The monomer composition (Type 3) may further contain one or more other epoxy compounds in addition to 1,2:8,9-diepoxylimonene. Such other epoxy compounds may be present in a content of typically about 1 to about 50 weight percent, preferably 5 to 40 weight percent, and particularly preferably 10 to 30 weight percent, of the total weight of the monomer composition (the total weight of all monomers contained in the monomer composition). The monomer composition, when containing other epoxy compounds in a content within the range, may effectively offer better adhesion to the substrate and/or better curability.

Monomer Composition (Type 4)

The monomer composition (Type 4) contains, as a cationically polymerizable monomer, the vinyl ether compound (A) including at least one of the compound represented by Formula (a-1) and the compound represented by Formula (a-2).

The at least one of the compound represented by Formula (a-1) and the compound represented by Formula (a-2) is present in a content of from 5 weight percent to less than 30 weight percent, preferably from 10 weight percent to less than 30 weight percent, and particularly preferably 10 to 25 weight percent, of the total weight of the monomer composition (the total weight of all monomers contained in the monomer composition). When both the two compounds are present, the term "content" refers to the total content of them. Assume that the monomer composition contains the at least one of the compound represented by Formula (a-1) and the compound represented by Formula (a-2) in a content greater than the range. Disadvantageously, this monomer composition, when incorporated with a photoacid generator, may give a curable composition that has a significantly lowered curing rate and is hardly cured in the presence of water. In contrast, assume that the monomer composition contains the at least one of the compound represented by Formula (a-1) and the compound represented by Formula (a-2) in a content less than the range. Disadvantageously, this monomer composition may fail to offer rapid curability.

The monomer composition (Type 4) may further contain one or more other vinyl ether compounds in addition to the at least one of the compound represented by Formula (a-1) and the compound represented by Formula (a-2). Such other vinyl ether compounds may be present in a content of typically about 1 to about 50 weight percent, preferably 5 to 40 weight percent, and particularly preferably 10 to 30 weight percent, of the total weight of the monomer composition (the total weight of all monomers contained in the monomer composition). In particular, the monomer composition preferably contains at least one of the vinyl ether compound (a') having a chain hydrocarbon skeleton and the vinyl ether compound (a") having a cyclic hydrocarbon skeleton. This is preferred because the monomer composition has rapid curability and allows the curable composition to form a cured product having excellent toughness. Examples of the vinyl ether compound (a') having a chain hydrocarbon skeleton includes the compounds represented by Formula (a'), of which divinyl ether compounds are preferred. Examples of the vinyl ether compound (a") having a cyclic hydrocarbon skeleton include the compounds represented by Formula (a"), of which divinyl ether compounds are preferred. The at least one of the vinyl ether compound (a') having a chain hydrocarbon skeleton and the vinyl ether compound (a") having a cyclic hydrocarbon skeleton may be present in a total content of typically 10 to 70 weight percent, preferably 20 to 60 weight percent, and particularly preferably 30 to 50 weight percent, of the total weight of all vinyl ether compounds contained in the monomer composition.

The monomer composition (Type 4) contains, as the oxetane compound (B), a monofunctional oxetane compound including 3-ethyl-3-[(2-ethylhexyloxy)methyl]oxetane, where the monofunctional oxetane compound is present in an amount of 10 to 85 weight percent, preferably 10 to 60 weight percent, and particularly preferably 20 to 40 weight percent, of the total weight of the monomer composition (the total weight of all monomers contained in the monomer composition).

The 3-ethyl-3-[(2-ethylhexyloxy)methyl]oxetane may be present in a content of typically about 5 to about 50 weight percent, preferably 10 to 40 weight percent, and particularly preferably 20 to 40 weight percent, of the total weight of the monomer composition (the total weight of all monomers contained in the monomer composition). The monomer composition, when containing 3-ethyl-3-[(2-ethylhexyloxy) methyl]oxetane in a content within the range, effectively offers better adhesion to the substrate.

The monomer composition (Type 4) contains 1,2:8,9-diepoxylimonene in an amount of 10 to 40 weight percent, and preferably 20 to 30 weight percent, of the total weight of the monomer composition (the total weight of all monomers contained in the monomer composition).

The monomer composition (Type 4) may further contain one or more other epoxy compounds in addition to 1,2:8,9-diepoxylimonene. Such other epoxy compounds may be present in a content of typically about 1 to about 50 weight percent, preferably 5 to 40 weight percent, and particularly preferably 10 to 30 weight percent, of the total weight of the monomer composition (the total weight of all monomers contained in the monomer composition). The monomer composition, when containing other epoxy compounds in a content within the range, may effectively offer better adhesion to the substrate and/or better curability.

The 1,2:8,9-diepoxylimonene and 3-ethyl-3-[(2-ethylhexyloxy)methyl]oxetane may be present in a total content of preferably 50 weight percent or more, particularly preferably 50 to 80 weight percent, and most preferably 50 to 60 weight percent, of the total weight of the monomer composition (the total weight of all monomers contained in the monomer composition).

Monomer Composition (Type 5)

The monomer composition (Type 5) contains at least one of the compound represented by (a-1) and the compound represented by (a-2), and a vinyl ether compound (a") having a cyclic hydrocarbon skeleton.

The at least one of the compound represented by (a-1) and the compound represented by (a-2) may be present in the monomer composition (Type 5) in a content of typically from about 5 weight percent to less than about 30 weight percent, preferably from 10 weight percent to less than 30 weight percent, and particularly preferably 10 to 25 weight percent, of the total weight of the monomer composition (the total weight of all cationically polymerizable monomers contained in the monomer composition). Assume that the monomer composition contains the at least one of the compound represented by Formula (a-1) and the compound represented by Formula (a-2) in an excessively high content. This monomer composition, when incorporated with a photoacid generator, tends to give a curable composition that is less resistant to cure inhibition by water. In contrast, assume that the monomer composition contains the at least one of the compound represented by Formula (a-1) and the compound represented by Formula (a-2) in an excessively low content. This monomer composition tends to less satisfactorily offer rapid curability.

In particular, the divinyl ether compound (a"-1) having a cyclic hydrocarbon skeleton is preferably selected from the compounds represented by Formula (a"-1). This is preferred for restraining cure inhibition by water while maintaining rapid curability.

The at least one of the compound represented by Formula (a-1) and the compound represented by Formula (a-2) and the divinyl ether compound (a"-1) having a cyclic hydrocarbon skeleton may be present in a total content of typically 10 to 80 weight percent, preferably 20 to 80 weight percent, particularly preferably 30 to 70 weight percent, and most preferably 30 to 60 weight percent, of the total weight of the monomer composition (the total weight of all cationically polymerizable monomers contained in the monomer composition). Assume that the monomer composition contains the at least one of the compound represented by Formula (a-1) and the compound represented by Formula (a-2) and the divinyl ether compound (a"-1) having a cyclic hydrocarbon skeleton in a total content greater than the range. This monomer composition tends to less gives a cured product having excellent substrate adhesion. In contrast, assume that the monomer composition contains the at least one of the compound represented by Formula (a-1) and the compound represented by Formula (a-2) and the divinyl ether compound (a"-1) having a cyclic hydrocarbon skeleton in a total content less than the range. This monomer composition tends to less satisfactorily offer rapid curability.

The ratio (in content; weight ratio) of the at least one of the compound represented by Formula (a-1) and the compound represented by Formula (a-2) to the divinyl ether compound (a"-1) having a cyclic hydrocarbon skeleton may be typically from about 90:10 to about 10:90, preferably from 80:20 to 20:80, more preferably from 75:25 to 30:70, and particularly preferably from 75:25 to 40:60. Assume that the monomer composition contains the at least one of the compound represented by Formula (a-1) and the compound represented by Formula (a-2) and the divinyl ether compound (a"-1) having a cyclic hydrocarbon skeleton in a ratio within the range. This monomer composition can have rapid curability and still resists cure inhibition by water. In contrast, assume that the monomer composition contains the at least one of the compound represented by Formula (a-1) and the compound represented by Formula (a-2) in an excessively large proportion (ratio). This monomer composition tends to be less resistant to cure inhibition by water. Also assume that the monomer composition contains the divinyl ether compound (a"-1) having a cyclic hydrocarbon skeleton in an excessively large proportion. This monomer composition tends to less satisfactorily offer rapid curability.

The monomer composition (Type 5) may further contain one or more other vinyl ether compounds, in addition to the at least one of the compound represented by Formula (a-1) and the compound represented by Formula (a-2), and the divinyl ether compound (a"-1) having a cyclic hydrocarbon skeleton. However, these divinyl ether compounds may be present in a total content of typically 50 weight percent or more, preferably 70 weight percent or more, and particularly preferably 85 weight percent or more, of the total weight of all vinyl ether compounds contained in the monomer composition.

The monomer composition (Type 5) contains, as the oxetane compound (B), a monofunctional oxetane compound. The monofunctional oxetane compound may be present in a content of typically about 10 to about 70 weight percent, preferably 20 to 60 weight percent, and particularly preferably 20 to 50 weight percent, of the total weight of the monomer composition (the total weight of all cationically polymerizable monomers contained in the monomer composition). The monomer composition, when containing the monofunctional oxetane compound in a content within the range and when incorporated with a photoacid generator, gives a curable composition that can be rapidly cured upon ultraviolet irradiation, even in the presence of water, to give a cured product having excellent substrate adhesion. In contrast, the monomer composition, if containing the monofunctional oxetane compound in a content greater than the range, tends to less satisfactorily offer rapid curability; and the monomer composition, if containing the monofunctional oxetane compound in a content less than the range, tends to offer lower substrate adhesion.

The monomer composition (Type 5) may further contain one or more multifunctional oxetane compounds (such as 1,4-bis([(3-ethyl-3-oxetanyl)methoxy]methyl)benzene and bis[(3-ethyloxetan-3-yl)methyl] ether), in addition to the monofunctional oxetane compound. However, the monofunctional oxetane compound may be present in a proportion of typically 50 weight percent or more, preferably 70 weight percent or more, and particularly preferably 85 weight percent or more, of the total weight of all oxetane compounds contained in the monomer composition.

The monomer composition (Type 5) preferably contains the epoxy compound (C) including an epoxy compound containing a cyclohexene oxide group. The epoxy compound (C) may be present in a content of typically 5 to 80 weight percent, preferably 10 to 70 weight percent, particularly preferably 20 to 60 weight percent, more preferably 20 to 50 weight percent, and most preferably 20 to 40 weight percent, of the total weight of the monomer composition (the total weight of all cationically polymerizable monomers contained in the monomer composition). The monomer composition, when containing the epoxy compound (C) in a content within the range and when incorporated with a photoacid generator, gives a curable composition that can be rapidly cured upon ultraviolet irradiation, even in the presence of water, to give a cured product having excellent substrate adhesion.

The monofunctional oxetane compound and the epoxy compound (C) may be present in a total content of typically about 15 to about 80 weight percent, preferably 30 to 70 weight percent, particularly preferably 40 to 70 weight percent, and most preferably 45 to 70 weight percent, of the total weight of the monomer composition (the total weight of all cationically polymerizable monomers contained in the monomer composition).

Monomer Composition (Type 6)

The monomer composition (Type 6) contains a monofunctional monomer (in particular, a monofunctional cationically polymerizable monomer) in an amount of 20 to 70 weight percent, preferably 20 to 60 weight percent, and particularly preferably 20 to 50 weight percent, of the total weight of the monomer composition (the total weight of all monomers contained in the monomer composition). The monomer composition having this configuration, when incorporated with a photoacid generator, gives a curable composition that less shrinks during the curing process and can give a cured product having excellent substrate adhesion.

The vinyl ether compound (A) includes the vinyl ether compound (a) having a cyclic ether skeleton and the vinyl ether compound (a') having a chain hydrocarbon skeleton in a total content of 10 to 40 weight percent, preferably 15 to 40 weight percent, and particularly preferably 20 to 40 weight percent, of the total weight of the monomer composition (the total weight of all monomers contained in the monomer composition).

The vinyl ether compound (a) having a cyclic ether skeleton is present in a content of from 5 weight percent to less than 30 weight percent, preferably 10 to 30 weight percent, and particularly preferably 15 to 30 weight percent, of the total weight of the monomer composition (the total weight of all monomers contained in the monomer composition). When two different vinyl ether compounds (a) are present, the term "content" refers to the total content of them. The monomer composition (Type 6) contains the vinyl ether compound (a) having a cyclic ether skeleton in a content within the range and, when incorporated with a photoacid generator, gives a curable composition that can resist cure inhibition by water and can still offer rapid curability. The monomer composition, if containing the vinyl ether compound (a) having a cyclic ether skeleton in a content greater than the range, less resists cure inhibition by water. In contrast, the monomer composition, if containing the vinyl ether compound (a) having a cyclic ether skeleton in a content less than the range, less satisfactorily offers rapid curability.

Of the vinyl ether compounds (a) having a cyclic ether skeleton, at least one of the compound represented by Formula (a-1) and the compound represented by Formula (a-2) is preferred.

The vinyl ether compound (a') having a chain hydrocarbon skeleton may be present in a content of typically about 5 to about 35 weight percent, preferably 5 to 25 weight percent, and particularly preferably 10 to 20 weight percent, of the total weight of the monomer composition (the total weight of all monomers contained in the monomer composition). When two different vinyl ether compounds (a') are present, the term "content" refers to the total content of them. The monomer composition, when containing the vinyl ether compound (a') having a chain hydrocarbon skeleton in a content within the range, effectively offers better adhesion to the substrate.

The ratio (in content; weight ratio) of the vinyl ether compound (a) having a cyclic ether skeleton to the vinyl ether compound (a') having a chain hydrocarbon skeleton may be typically from about 10:90 to about 90:10, preferably from 30:70 to 80:20, and particularly preferably from 50:50 to 70:30. The monomer composition, if containing the vinyl ether compound (a) having a cyclic ether skeleton in an excessively large proportion, tends to less resist cure inhibition by water. In contrast, the monomer composition, if containing the vinyl ether compound (a') having a chain hydrocarbon skeleton in an excessively large proportion, tends to less satisfactorily offer rapid curability.

The monomer composition (Type 6) may further contain one or more other vinyl ether compounds, in addition to the vinyl ether compound (a) having a cyclic ether skeleton and the vinyl ether compound (a') having a chain hydrocarbon skeleton.

The monomer composition (Type 6) preferably further contains, as the vinyl ether compound (A), a vinyl ether compound (a") having a cyclic hydrocarbon skeleton. The vinyl ether compound (a") having a cyclic hydrocarbon skeleton may be present in a content of typically about 1 to about 50 weight percent, preferably 5 to 50 weight percent, and particularly preferably 5 to 30 weight percent, and most preferably 5 to 20 weight percent, of the total weight of the monomer composition (the total weight of all monomers contained in the monomer composition).

The monomer composition (Type 6) may further contain one or more vinyl ether compounds other than the vinyl ether compounds (a) having a cyclic ether skeleton, the vinyl ether compounds (a') having a chain hydrocarbon skeleton, and the vinyl ether compounds (a") having a cyclic hydrocarbon skeleton. However, such other vinyl ether compounds may be present in a content of about 20 percent or less, and preferably 10 weight percent or less, of the total weight of all vinyl ether compounds contained in the monomer composition.

The monomer composition (Type 6) preferably contains the oxetane compound (B). This is preferred because the monomer composition can offer better adhesion to a variety of substrates and can impart toughness to the cured product. The oxetane compound (B) may be present in a content of typically about 5 to about 80 weight percent, preferably 10 to 70 weight percent, and particularly preferably 15 to 60 weight percent, of the total weight of the monomer composition (the total weight of all monomers contained in the monomer composition). The monomer composition, when containing the oxetane compound (B) in a content within the range and when incorporated with a photoacid generator, gives a curable composition that resists cure inhibition by water and can still offer rapid curability.

The monomer composition (Type 6) may further contain the epoxy compound (C). The epoxy compound (C) may be present in a content of typically about 5 to about 80 weight percent, preferably 10 to 60 weight percent, and particularly preferably 10 to 40 weight percent, of the total weight of the monomer composition (the total weight of all monomers contained in the monomer composition). The monomer composition, when containing the epoxy compound (C) in a content within the range and when incorporated with a photoacid generator, gives a curable composition that forms a cured product having excellent substrate adhesion.

The monomer composition (Type 1-6) may further contain one or more monomers other than the compounds. However, such other monomers may be present in a content of about 30 weight percent or less, and preferably 20 weight percent or less, of the total weight of the monomer composition (the total weight of all monomers contained in the monomer composition).

The monomer compositions according to the present invention may each be produced typically by uniformly mixing the vinyl ether compound (A), the oxetane compound (B), the epoxy compound (C), and, as needed, one or more of other components such as other cationically polymerizable monomers, using a generally known mixing apparatus. The mixing apparatus is exemplified typically by planetary centrifugal mixers (rotation/revolution mixing and deaeration machines), homogenizers, planetary mixers, triple roll mills, and bead mills. The components may be mixed at once or in succession (one by one).

Curable Composition

The curable composition according to the present invention contains any of the monomer compositions and a photoacid generator.

Photoacid Generator

The photoacid generator is a compound that generates an acid by light irradiation and is also called "cationic photoinitiator". The photoacid generator includes a cationic moiety and an anionic moiety, where the cationic moiety absorbs light, and the anionic moiety generates an acid (acts as an acid source). Non-limiting examples of the photoacid generator include diazonium salt compounds, iodonium salt compounds, sulfonium salt compounds, phosphonium salt compounds, selenium salt compounds, oxonium salt compounds, ammonium salt compounds, bromine salt compounds, metallocene complexes, and iron-arene complexes. The curable composition may contain each of different photoacid generators alone or in combination.

Non-limiting examples of the cationic moieties in the sulfonium salt compounds include arylsulfonium ions such as (4-hydroxyphenyl)methylbenzylsulfonium ion, triphenylsulfonium ion, diphenyl[4-(phenylthio)phenyl]sulfonium ion, and tri-p-tolylsulfonium ion, of which triarylsulfonium ions are typified.

Non-limiting examples of the anionic moiety in the photoacid generators include $BF_4^-$, $CF_3SO_3^-$, $CH_3C_6H_4SO_3^-$, $CH_3(NO_2)C_6H_4SO_3^-$, $B(C_6F_5)^-$, $PF_6^-$, $[(Rf)_tPF_{6-t}]^-$ (where Rf represents, independently in each occurrence, alkyl except with fluorine atoms replacing 80% or more of hydrogen atoms of the alkyl; and t represents an integer of 1 to 5), $AsF_6^-$, $SbF_6^-$, $SbF_5OH^-$, halogenic anions, sulfonate anions, carboxylate anions, and sulfate anions.

Non-limiting examples of the photoacid generator for use in the present invention include compounds represented by the formulae:

[Chem. 17]

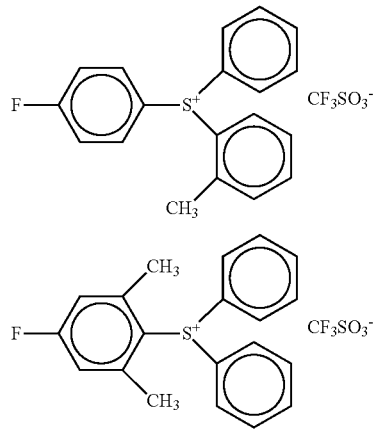

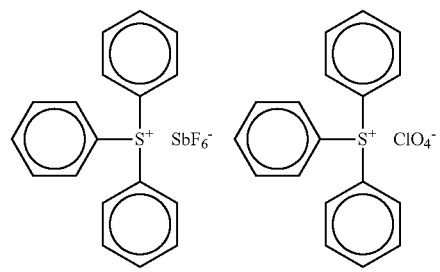

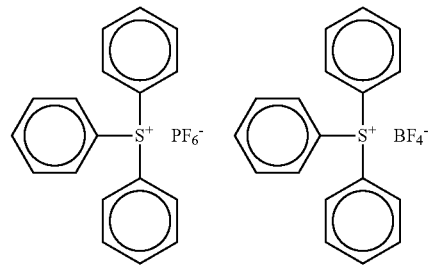

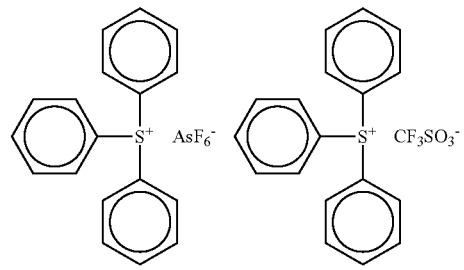

-continued
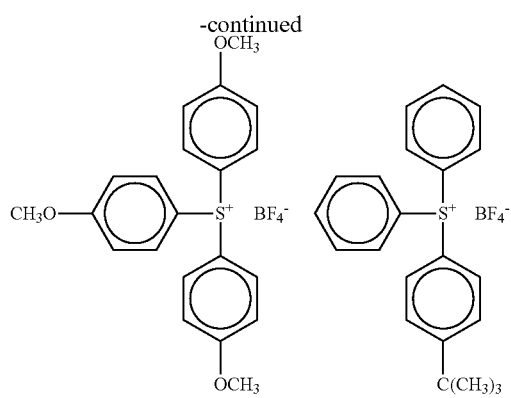
[Chem. 18]
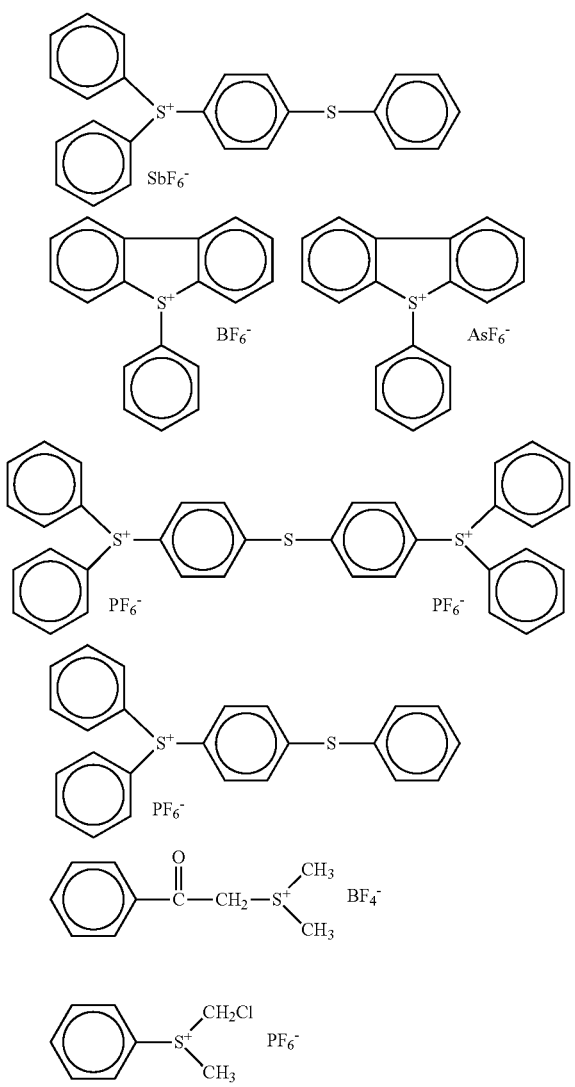
-continued
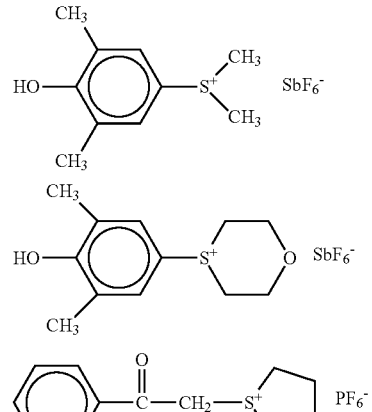
[Chem. 19]
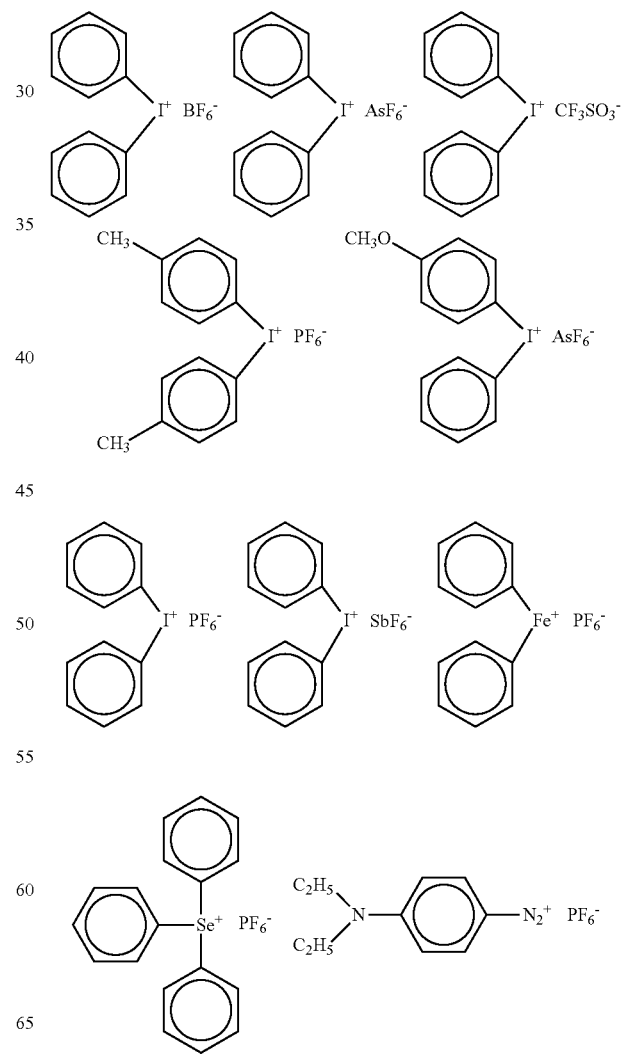

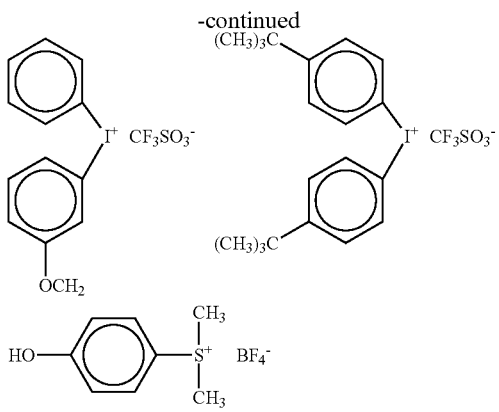

The photoacid generator for use in the present invention may be selected from commercial products available typically under the trade names: CYRACURE UVI-6970, CYRACURE UVI-6974, CYRACURE UVI-6990, and CYRACURE UVI-950 (each from Union Carbide Corporation, U.S.A.); IRGACURE 250, IRGACURE 261, IRGACURE 264, IRGACURE 270, and IRGACURE 290 (each from BASF SE); CG-24-61 (from Ciba Geigy Ltd.); ADEKA OPTOMER SP-150, ADEKA OPTOMER SP-151, ADEKA OPTOMER SP-170, and ADEKA OPTOMER SP-171 (each from ADEKA CORPORATION); DAICAT II (from Daicel Corporation); UVAC 1590 and UVAC 1591 (each from DAICEL-CYTEC Company, Ltd.); CI-2064, CI-2639, CI-2624, CI-2481, CI-2734, CI-2855, CI-2823, CI-2758, and CIT-1682 (each from Nippon Soda Co., Ltd.); PI-2074 (from Rhodia, toluylcumyliodonium tetrakis(pentafluorophenyl)borate); FFC509 (from 3M Company); BBI-102, BBI-101, BBI-103, MPI-103, BDS-105, TPS-103, MDS-103, MDS-105, MDS-203, MDS-205, DTS-102, DTS-103, NAT-103, NDS-103, BMS-105, and TMS-105 (each from Midori Kagaku Co., Ltd.); CD-1010, CD-1011, and CD-1012 (each from Sartomer Company, Inc., U.S.A.); CPI-100P, CPI-101A, CPI-110P, CPI-110A, and CPI-210S (each from San-Apro Ltd.); and UVI-6992 and UVI-6976 (each from The Dow Chemical Company).

The monomer composition may be present in a content of typically about 50 to about 99.9 weight percent, and preferably 70 to 99.5 weight percent, of the total weight (100 weight percent) of the curable composition according to the present invention.

The photoacid generator in the curable composition according to the present invention may be present in a proportion of typically about 0.1 to about 20 parts by weight, and preferably 0.5 to 10 parts by weight, per 100 parts by weight of the monomer composition.

The curable composition according to the present invention is preferably a solvent-free system, namely, is preferably approximately devoid of solvents. This is preferred because the curable composition can have better drying behavior, can be applied even to a substrate being susceptible to deterioration by solvents, and less suffers from odors generated due to volatilization of solvents. The curable composition may have a solvent content of 10 weight percent or less, preferably 5 weight percent or less, and particularly preferably 1 weight percent or less, of the total weight (100 weight percent) of the curable composition.

The curable composition according to the present invention may further contain, as needed, one or more other components in addition to the monomer composition and the photoacid generator. Non-limiting examples of such other components include known or common sensitizers (such as acridine compounds, benzoflavins, perylenes, anthracenes, thioxanthone compounds, and laser dyes), sensitizing auxiliaries, antioxidants, and stabilizers (such as amines). In particular, assume that the curable composition according to the present invention is to be used in applications where the curable composition is cured by irradiation with light from a UV-LED. In this case, the curable composition preferably contains a sensitizer alone or, as needed, in combination with a sensitizing auxiliary. This is preferred for better ultraviolet absorptivity of the photoacid generator to allow the curable composition to offer better curability. These components may be present in a content of typically about 0.05 to about 10 weight percent, and preferably 0.1 to 5 weight percent, of the total weight (100 weight percent) of the curable composition. When two or more different substances belonging to these components are present, the term "content" refers to the total content of them.

The curable composition according to the present invention has a surface tension (at 25° C. and 1 atmospheric pressure) of typically about 10 to about 50 mN/m, preferably 15 to 40 mN/m, and particularly preferably 15 to 30 mN/m. The curable composition according to the present invention has a viscosity (at 25° C. and a shear rate of 10 (1/s)) of typically about 1 to about 1000 mPa·s, preferably 3 to 500 mPa·s, particularly preferably 5 to 100 mPa·s, more preferably 5 to 50 mPa·s, and most preferably 8 to 30 mPa·s. The curable composition according to the present invention therefore has excellent dischargeability and/or excellent filling properties.

The curable composition according to the present invention can be rapidly cured by irradiation with an ultraviolet ray to form a cured product, even in the presence of oxygen and/or water. Thus, the curable composition, when used in a UV-curable inkjet ink, allows the ink to resist bleeding, to less cause odors, and to form an ink layer (ink film) having excellent print quality.

A light source for the ultraviolet ray is not limited, as long as being capable of applying light to the curable composition to generate an acid in the curable composition. The light source for use herein may be selected typically from UV-LEDs, mercury lamps such as low-, medium-, or high-pressure mercury lamps, mercury xenon lamps, metal halide lamps, tungsten lamps, arc lamps, excimer lamps, excimer laser, semiconductor laser, YAG laser, laser systems using laser in combination with a nonlinear optical crystal, and high-frequency induction ultraviolet generators. The quantity (integrated irradiance) of ultraviolet rays to be irradiated is typically about 10 to about 1000 mJ/cm$^2$.

The curable composition according to the present invention may be further subjected to a heat treatment, after ultraviolet irradiation. The curable composition, when subjected to a heat treatment, can be cured with a still higher degree of cure. The heat treatment may be performed at a heating temperature of about 40° C. to about 200° C. for a heating time of about 1 minute to about 15 hours. Such a higher degree of cure can also be obtained by leaving the curable composition after ultraviolet irradiation left stand at room temperature (about 20° C.) for about 1 to about 48 hours.

In addition, the curable composition according to the present invention can form a cured product having excellent adhesion to a wide variety of substrates. Non-limiting examples of the substrates include glass; metals such as aluminum foil and copper foil; plastics such as polyethylenes, polypropylenes, poly(ethylene terephthalate)s (PETs), vinyl chloride resins, and polycarbonates; natural rubber;

isobutylene-isoprene rubber; foams typically of polyurethanes and polychloroprene rubber; wood; woven fabrics; nonwoven fabrics; cloth; paper such as woodfree paper, glassine paper, kraft paper, and Japanese paper; silicon wafers; ceramics; and composites of them.

The curable composition according to the present invention, as having the characteristic properties, is advantageously usable typically as or for UV-curable inkjet ink materials, coating materials, adhesives, encapsulants, civil engineering and construction materials, laminates and other electric/electronic components, photoresists, solder masks (solder resists), interlayer components for multilayer printed circuit boards, insulating materials, repairing materials for concrete buildings, casting materials, sealants, stereolithographic materials, and optical materials for optical components such as lenses and optical waveguides.

In particular, the curable composition according to the present invention is preferably used as or for UV-curable inkjet ink materials (such as a UV-curable inkjet transparent ink). Such a UV-curable inkjet transparent ink including the curable composition according to the present invention, when combined with at least one selected from pigments and dyes, can form a variety of pigment/dye inks (pigment inks, dye inks, and inks containing both a pigment and a dye). The curable composition is also usable as or for priming inks and varnishing inks. The priming inks and varnishing inks are inks which are to be applied before and/or after the application of a pigment/dye ink and allow the pigment/dye ink to be more readily fixed to the substrate surface and to form an ink layer with bright coloration and high image quality. The priming inks and varnishing inks also contribute to elimination or minimization of ink strike-through and offer better weatherability and better water resistance.

UV-Curable Inkjet Ink

The UV-curable inkjet ink (in particular, pigment/dye ink) according to the present invention contains the curable composition and at least one selected from pigments and dyes (pigment and/or dye). The curable composition herein acts as a UV-curable inkjet transparent ink.

Pigments

The pigments for use herein can be selected, without limitation, from coloring materials that are generally known as pigments and are dispersible in the curable composition. The pigments each preferably have an average particle diameter of about 300 nm or less. This is preferred because the ink is dischargeable excellently, can fly satisfactorily, and offers excellent print reproducibility. The ink may contain each of different pigments alone or in combination.

The pigment may be selected from those having any of other properties such as magnetism, fluorescence, electroconductivity, and dielectricity, in addition to color developing and coloring abilities. In this case, the pigment can impart various functions to images.

Non-limiting examples of such pigments usable herein include inorganic pigments, organic pigments, and fluorescent pigments. Non-limiting examples of the inorganic pigments include earthen pigments such as ocher and amber; lapis lazuli; azurite; chalk; white wash; white lead; vermilion; ultramarine; viridian; cadmium red; carbonaceous pigments such as carbon black, carbon refined, and carbon nanotubes; metal oxide pigments such as iron black, cobalt blue, zinc oxide, titanium oxide, chromium oxide, and iron oxide; metal sulfide pigments such as zinc sulfide; metal sulfates; metal carbonates such as calcium carbonate and magnesium carbonate; metal silicates; metal phosphates; and metal powders such as aluminum powder, bronze powder, and zinc powder. Non-limiting examples of the organic pigments include insoluble azo pigments such as monoazo yellow, monoazo red, monoazo violet, disazo yellow, disazo orange, and pyrazolone pigments; soluble azo pigments such as azo yellow lake and azo lake red; benzimidazolone pigments; β-naphthol pigments; naphthol AS pigment; condensed azo pigments; quinacridone pigments such as quinacridone red and quinacridone magenta; perylene pigments such as perylene red and perylene scarlet; perinone pigments such as perinone orange; isoindolinone pigments such as isoindolinone yellow and isoindolinone orange; isoindoline pigments such as isoindoline yellow; dioxazine pigments such as dioxazine violet; thioindigo pigments; anthraquinone pigments; quinophthalone pigments such as quinophthalone yellow; metal complex pigments; diketopyrrolopyrrole pigments; phthalocyanine pigments such as phthalocyanine blue and phthalocyanine green; and dye lake pigments. Non-limiting examples of the fluorescent pigments include inorganic fluorophors and organic fluorophors.

Dyes

Non-limiting examples of the dye include nitroaniline, phenyl monoazo, pyridone azo, quinophthalone, styryl, anthraquinone, naphthalimide azo, benzothiazolylazo, phenyl disazo, and thiazolylazo dyes.

The UV-curable inkjet ink according to the present invention may contain the pigment and/or dye in a proportion of typically about 0.5 to about 20 parts by weight, and preferably 1 to 10 parts by weight, per 100 parts by weight of the curable composition. When the ink contains two or more different substances belonging to these components, the term "proportion" refers to the total proportion of them.

The UV-curable inkjet ink according to the present invention may further contain a dispersant for better dispersibility of the pigment and/or dye. Non-limiting examples of the dispersant include nonionic surfactants, ionic surfactants, charging agents, and polymeric dispersants (such as commercial products available under the trade names of Solsperse 24000 and Solsperse 32000, each from Avecia Ltd.). The ink may contain each of them alone or in combination.

The ink may contain the dispersant in a proportion of typically about 1 to about 50 parts by weight, and preferably 3 to 30 parts by weight, per 100 parts by weight of the pigment and/or dye.

The UV-curable inkjet ink according to the present invention, as containing the curable composition, can form an ink layer with extremely high definition at high speed in an air atmosphere, where the ink layer can be formed without limitations on humidity conditions and substrates, while less causing odors.

EXAMPLES

The present invention will be illustrated in further detail with reference to several examples below. It should be noted, however, that the examples are by no means intended to limit the scope of the present invention.

Example 1-1

Materials, i.e., 25 parts by weight of ONB-DVE, 25 parts by weight of CELLOXIDE 2021P, 50 parts by weight of OXT-212, and 5 parts by weight of a photoacid generator were mixed and yielded a curable composition. This had a surface tension (at 25° C. and 1 atmospheric pressure) of 19.5 mN/m and a viscosity (at 25° C. and a shear rate of 10 (1/s)) of 12 mPa s.

Examples 1-2 to 1-18 and Comparative Examples 1-1 to 1-7

Procedures similar to that in Example 1-1 were performed, except for employing the material formulations given in Tables 1 and 2 to form monomer compositions.

Example 2-1

Materials, i.e., 50 parts by weight of ALOX, 25 parts by weight of ONB-DVE, 25 parts by weight of CELLOXIDE 2021P, and 5 parts by weight of a photoacid generator were mixed and yielded a curable composition. This had a surface tension (at 25° C. and 1 atmospheric pressure) of 19.6 mN/m and a viscosity (at 25° C. and a shear rate of 10 (1/s)) of 15.1 mPa·s.

Examples 2-2 to 2-21 and Comparative Examples 2-1 to 2-5

Procedures similar to that in Example 2-1 were performed, except for employing the material formulations given in Tables 3 to 5 to form monomer compositions.

Example 3-1

Materials, i.e., 25 parts by weight of ONB-DVE, 25 parts by weight of 4CH-DVE, 50 parts by weight of CELLOXIDE 3000, and 5 parts by weight of a photoacid generator were mixed and yielded a curable composition. This had a surface tension (at 25° C. and 1 atmospheric pressure) of 24.1 mN/m and a viscosity (at 25° C. and a shear rate of 10 (1/s)) of 15.5 mPa·s.

Examples 3-2 to 3-14 and Comparative Examples 3-1 to 3-4

Procedures similar to that in Example 3-1 were performed, except for employing the material formulations given in Tables 6 and 7 to form monomer compositions.

Example 4-1

Materials, i.e., 25 parts by weight of ONB-DVE, 25 parts by weight of 4CH-DVE, 20 parts by weight of CELLOXIDE 2021P, 30 parts by weight of OXT-212, and 5 parts by weight of a photoacid generator were mixed and yielded a curable composition. This had a surface tension (at 25° C. and 1 atmospheric pressure) of 20.1 mN/m and a viscosity (at 25° C. and a shear rate of 10 (1/s)) of 14 mPa·s.

Examples 4-2 to 4-22 and Comparative Examples 4-1 to 4-7

Procedures similar to that in Example 4-1 were performed, except for employing the material formulations given in Tables 8 and 9 to form monomer compositions.

Example 5-1

Materials, i.e., 25 parts by weight of ISB-DVE, 15 parts by weight of TEGDVE, 40 parts by weight of OXT-212, 20 parts by weight of CELLOXIDE 2021P, and 5 parts by weight of a photoacid generator were mixed and yielded a curable composition. This had a surface tension (at 25° C. and 1 atmospheric pressure) of 21.1 mN/m and a viscosity (at 25° C. and a shear rate of 10 (1/s)) of 14 mPa·s.

Examples 5-2 to 5-12 and Comparative Examples 5-1 to 5-5

Procedures similar to that in Example 5-1 were performed, except for employing the material formulations given in Tables 10 and 11 to form monomer compositions.

Curability Evaluation

Each of the prepared curable compositions was applied onto a glass plate to form a coating having a thickness of 5 μm and irradiated with ultraviolet rays using a mercury-xenon lamp (product LC8 LIGHTNINGCURE L9588, supplied by Hamamatsu Photonics K.K.) as a light source. An integrated irradiance (in $mJ/cm^2$) until the coating became tack-free was measured, on the basis of which the curability was evaluated. Specifically, an integrated irradiance until the coating became tack-free or the coating remained without separation from the glass plate upon rubbing of the coating surface with a ply of Kimwipes (registered trademark) was measured. The integrated irradiance is an integrated irradiance necessary for curing of such a curable composition approximately devoid of water (water-free curable composition).

Curability Evaluation in the Presence of Water

Each of the prepared curable compositions (100 parts by weight) was combined with and stirred with water (5 parts by weight) and yielded water-containing curable compositions.

An integrated irradiance (in $mJ/cm^2$) until the resulting coating became tack-free was measured by a procedure similar to that in the above-mentioned curability evaluation, except for using the water-containing curable compositions instead of the curable compositions. The rate of increase in integrated irradiance caused by water addition was calculated according to an expression below, to evaluate curability in the presence of water according to criteria as follows.

Rate of increase (%) in integrated irradiance={((Integrated irradiance necessary for curing of water-containing curable composition)/(Integrated irradiance necessary for curing of water-free curable composition))−1}×100

Evaluation criteria for curability in the presence of water:

Poor curability (Poor): rate of increase in integrated irradiance of 20% or more;

Good curability (Good): rate of increase in integrated irradiance of from 10% to less than 20%; and Very good curability (VG): rate of increase in integrated irradiance of less than 10%.

Substrate Adhesion Evaluation

Each of the prepared curable compositions was applied to a substrate (glass plate or PET plate) to form a coating having a thickness of 5 μm, irradiated with ultraviolet rays using a mercury-xenon lamp as a light source until the coating became tack-free, and yielded a laminate of the coating and the glass plate, and a laminate of the coating and the PET plate.

Each eleven (11) slits were made on the coating surface of each of the prepared laminates lengthwise and crosswise at 1-mm intervals in a grid manner and yielded samples each having hundred 1-mm square crosscuts. A cellophane adhesive tape (trade name Cellotape (registered trademark), supplied by Nichiban Co., Ltd., 24 mm wide) was laminated onto the crosscuts by one reciprocating movement of a 2-kg roller, and was then removed by quickly pulling the tape in a direction perpendicular to the substrate at an ambient temperature of 20° C. The adhesion was evaluated from the number of crosscuts remained without separation according to the following criteria (in conformity with JIS K-5400: 1990):

Evaluation Criteria for Substrate Adhesion

Very good substrate adhesion (VG): 0 to 15 crosscuts were separated from the substrate;

Good substrate adhesion (Good): 16 to 30 crosscuts were separated from the substrate; and Poor substrate adhesion (Poor): 31 to 100 crosscuts were separated from the substrate.

TABLE 1

| | Curable composition | | | | Curability (integrated irradiance in mJ/cm²) | | Curability in the presence of water | Substrate adhesion | |
|---|---|---|---|---|---|---|---|---|---|
| | Monomer composition | | | Photoacid generator | | | | | |
| | Vinyl ether compound (part by weight) | Epoxy compound (part by weight) | Oxetane compound (part by weight) | (part by weight) | Water-free composition | Composition containing 5% water | | Glass plate | PET plate |
| Example 1-1 | ONB-DVE (25) | CELLOXIDE 2021P (25) | OXT-212 (50) | 5 | 300 | 300 | VG | VG | VG |
| Example 1-2 | ONB-DVE (25) | CELLOXIDE 2021P (25) | OXT-212 (40) OXT-221 (10) | 5 | 300 | 350 | Good | VG | VG |
| Example 1-3 | ONB-DVE (25) | CELLOXIDE 2021P (25) E-PS (20) | OXT-212 (30) | 5 | 350 | 400 | Good | VG | VG |
| Example 1-4 | ISB-DVE (25) | CELLOXIDE 2021P (25) | OXT-212 (50) | 5 | 350 | 375 | VG | VG | VG |
| Example 1-5 | ISB-DVE (25) | CELLOXIDE 2021P (25) E-PS (20) | OXT-212 (30) | 5 | 300 | 325 | VG | VG | VG |
| Example 1-6 | ISB-DVE (25) CHVE (25) | CELLOXIDE 2021P (20) | OXT-212 (30) | 5 | 300 | 300 | VG | VG | VG |
| Example 1-7 | ISB-DVE (25) 2-EHVE (25) | CELLOXIDE 2021P (20) | OXT-212 (30) | 5 | 300 | 325 | VG | VG | VG |
| Example 1-8 | ONB-DVE (25) CHVE (25) | CELLOXIDE 2021P (20) | OXT-212 (30) | 5 | 250 | 250 | VG | VG | VG |
| Example 1-9 | ISB-DVE (25) CHVE (25) | E-PS (20) | OXT-212 (30) | 5 | 400 | 450 | Good | Good | VG |
| Example 1-10 | ISB-DVE (10) | CELLOXIDE 2021P (60) | OXT-212 (30) | 5 | 300 | 300 | VG | VG | VG |
| Example 1-11 | ISB-DVE (10) | CELLOXIDE 2021P (40) | OXT-212 (50) | 5 | 400 | 450 | Good | VG | VG |
| Example 1-12 | ONB-DVE (10) | CELLOXIDE 2021P (60) | OXT-212 (30) | 5 | 300 | 350 | Good | VG | VG |
| Example 1-13 | ONB-DVE (10) | CELLOXIDE 2021P (40) | OXT-212 (50) | 5 | 400 | 450 | Good | VG | VG |
| Comp. Ex. 1-1 | ONB-DVE (50) | CELLOXIDE 2021P (20) | OXT-212 (30) | 5 | 200 | 300 | Poor | VG | VG |
| Comp. Ex. 1-2 | ONB-DVE (50) | CELLOXIDE 2021P (20) | OXT-221 (30) | 5 | 300 | 700 | Poor | Poor | Poor |
| Comp. Ex. 1-3 | ONB-DVE (50) | CELLOXIDE 2021P (10) E-PS (10) | OXT-212 (30) | 5 | 300 | 600 | Poor | VG | VG |
| Comp. Ex. 1-4 | ONB-DVE (50) | — | OXT-212 (50) | 5 | 250 | 600 | Poor | VG | VG |
| Comp. Ex. 1-5 | ISB-DVE (50) | CELLOXIDE 2021P (20) | OXT-212 (30) | 5 | 300 | 450 | Poor | VG | VG |
| Comp. Ex. 1-6 | ISB-DVE (50) | CELLOXIDE 2021P (10) E-PS (10) | OXT-212 (30) | 5 | 350 | 700 | Poor | VG | VG |
| Comp. Ex. 1-7 | TEGDVE (50) | CELLOXIDE 2021P (20) | OXT-212 (30) | 5 | 500 | >1000 | Poor | VG | VG |

TABLE 2

| | Curable composition | | | | Curability (integrated irradiance in mJ/cm²) | | Curability in the presence of water | Substrate adhesion | |
|---|---|---|---|---|---|---|---|---|---|
| | Monomer composition | | | Photoacid generator | | | | | |
| | Vinyl ether compound (part by weight) | Epoxy compound (part by weight) | Oxetane compound (part by weight) | (part by weight) | Water-free composition | Composition containing 5% water | | Glass plate | PET plate |
| Example 1-14 | ONB-DVE (25) | CELLOXIDE 2021P (25) X-22-163 (20) | OXT-212 (30) | 5 | 300 | 350 | Good | VG | VG |
| Example 1-15 | ISB-DVE (25) | CELLOXIDE 2021P (35) EP0419 (10) | OXT-212 (30) | 5 | 300 | 350 | Good | VG | VG |
| Example 1-16 | ONB-DVE (25) | CELLOXIDE 2021P (25) EP0419 (20) | OXT-212 (30) | 5 | 300 | 350 | Good | VG | VG |
| Example 1-17 | ISB-DVE (25) | CELLOXIDE 2021P (25) KF-105 (20) | OXT-212 (30) | 5 | 350 | 400 | Good | VG | VG |
| Example 1-18 | ONB-DVE (25) CHVE (25) | CELLOXIDE 2021P (15) EP0408 (10) | OXT-212 (25) | 5 | 300 | 350 | Good | VG | VG |

TABLE 3

| | Curable composition | | | | Curability (integrated irradiance in mJ/cm²) | | Curability in the presence of water | Substrate adhesion | |
|---|---|---|---|---|---|---|---|---|---|
| | Monomer composition | | | Photoacid generator | | | | | |
| | Oxetane compound (part by weight) | Vinyl ether compound (part by weight) | Epoxy compound (part by weight) | (part by weight) | Water-free composition | Composition containing 5% water | | Glass plate | PET plate |
| Example 2-1 | ALOX (50) | ONB-DVE (25) | CELLOXIDE 2021P (25) | 5 | 200 | 200 | VG | VG | VG |
| Example 2-2 | ALOX (30) | ONB-DVE (25) | CELLOXIDE 2021P (25) E-PS (20) | 5 | 300 | 325 | VG | VG | VG |
| Example 2-3 | ALOX (50) | ISB-DVE (25) | CELLOXIDE 2021P (25) | 5 | 250 | 250 | VG | VG | VG |
| Example 2-4 | ALOX (30) | ISB-DVE (25) | CELLOXIDE 2021P (25) E-PS (20) | 5 | 350 | 350 | VG | VG | VG |
| Example 2-5 | ALOX (30) | ONB-DVE (25) CHVE (25) | CELLOXIDE 2021P (20) | 5 | 200 | 200 | VG | VG | VG |
| Example 2-6 | ALOX (30) | ISB-DVE (25) CHVE (25) | CELLOXIDE 2021P (20) | 5 | 250 | 250 | VG | VG | VG |
| Example 2-7 | ALOX (30) | ONB-DVE (25) 4CH-DVE (25) | CELLOXIDE 2021P (20) | 5 | 150 | 150 | VG | VG | VG |
| Example 2-8 | ALOX (30) | ISB-DVE (25) 4CH-DVE (25) | CELLOXIDE 2021P (20) | 5 | 200 | 200 | VG | VG | VG |
| Example 2-9 | ALOX (30) | ISB-DVE (25) CHVE (25) | E-PS (20) | 5 | 350 | 400 | Good | Good | VG |
| Example 2-10 | ALOX (45) | ONB-DVE (25) 4CH-DVE (10) | CELLOXIDE 2021P (20) | 5 | 200 | 200 | VG | VG | VG |
| Example 2-11 | ALOX (45) | ISB-DVE (25) 4CH-DVE (10) | CELLOXIDE 2021P (20) | 5 | 250 | 250 | VG | VG | VG |
| Example 2-12 | ALOX (50) | ONB-DVE (25) 4CH-DVE (25) | — | 5 | 200 | 200 | VG | VG | VG |

TABLE 4

| | Curable composition | | | | Curability (integrated irradiance in mJ/cm²) | | Curability in the presence of water | Substrate adhesion | |
|---|---|---|---|---|---|---|---|---|---|
| | Monomer composition | | | Photoacid generator | | | | | |
| | Oxetane compound (part by weight) | Vinyl ether compound (part by weight) | Epoxy compound (part by weight) | (part by weight) | Water-free composition | Composition containing 5% water | | Glass plate | PET plate |
| Example 2-13 | ALOX (50) | ISB-DVE (25) 4CH-DVE (25) | — | 5 | 300 | 300 | VG | VG | VG |
| Example 2-14 | ALOX (30) | ONB-DVE (25) 4CH-DVE (45) | — | 5 | 150 | 150 | VG | Good | VG |
| Example 2-15 | ALOX (30) | ISB-DVE (25) 4CH-DVE (45) | — | 5 | 150 | 150 | VG | Good | VG |
| Example 2-16 | EHOX (50) | ONB-DVE (25) | CELLOXIDE 2021P (25) | 5 | 250 | 250 | VG | VG | VG |
| Example 2-17 | EHOX (50) | ISB-DVE (25) | CELLOXIDE 2021P (25) | 5 | 250 | 250 | VG | VG | VG |
| Example 2-18 | EHOX (50) | ONB-DVE (25) 4CH-DVE (25) | — | 5 | 250 | 250 | VG | VG | VG |
| Example 2-19 | EHOX (50) | ISB-DVE (25) 4CH-DVE (25) | — | 5 | 300 | 300 | VG | VG | VG |
| Comp. Ex. 2-1 | OXT-212 (30) | ONB-DVE (50) | CELLOXIDE 2021P (20) | 5 | 200 | 300 | Poor | VG | VG |
| Comp. Ex. 2-2 | OXT-212 (50) | ONB-DVE (50) | — | 5 | 250 | 600 | Poor | VG | VG |
| Comp. Ex. 2-3 | OXT-212 (30) | ISB-DVE (50) | CELLOXIDE 2021P (20) | 5 | 300 | 450 | Poor | VG | VG |
| Comp. Ex. 2-4 | OXT-212 (30) | TEGDVE (50) | CELLOXIDE 2021P (20) | 5 | 500 | >1000 | Poor | VG | VG |
| Comp. Ex. 2-5 | OXT-212 (50) | ISB-DVE (50) | — | 5 | 300 | 600 | Poor | VG | VG |

TABLE 5

| | Curable composition | | | | | | | | |
|---|---|---|---|---|---|---|---|---|---|
| | Monomer composition | | | Photoacid generator | Curability (integrated irradiance in mJ/cm$^2$) | | Curability in the presence of water | Substrate adhesion | |
| | Oxetane compound (part by weight) | Vinyl ether compound (part by weight) | Epoxy compound (part by weight) | (part by weight) | Water-free composition | Composition containing 5% water | | Glass plate | PET plate |
| Example 2-20 | ALOX (30) | ONB-DVE (25) | CELLOXIDE 2021P (15) E-PS (20) X-22-163 (10) | 5 | 350 | 350 | VG | VG | VG |
| Example 2-21 | ALOX (50) | ISB-DVE (25) | CELLOXIDE 2021P (15) KF-105 (10) | 5 | 350 | 350 | VG | VG | VG |

TABLE 6

| | Curable composition | | | | Curability (integrated irradiance in mJ/cm$^2$) | | Curability in the presence of water | Substrate adhesion | |
|---|---|---|---|---|---|---|---|---|---|
| | Monomer composition | | | | | | | | |
| | Vinyl ether compound (part by weight) | Epoxy compound (part by weight) | Oxetane compound (part by weight) | Photoacid generator (part by weight) | Water-free composition | Composition containing 5% water | | Glass plate | PET plate |
| Example 3-1 | ONB-DVE (25) 4CH-DVE (25) | CELLOXIDE 3000 (50) | — | 5 | 350 | 350 | VG | VG | VG |
| Example 3-2 | ISB-DVE (25) 4CH-DVE (25) | CELLOXIDE 3000 (50) | — | 5 | 400 | 400 | VG | VG | VG |
| Example 3-3 | ISB-DVE (25) | CELLOXIDE 3000 (50) CELLOXIDE 2021P (25) | — | 5 | 300 | 300 | VG | VG | VG |
| Example 3-4 | ISB-DVE (25) TEGDVE (25) | CELLOXIDE 3000 (50) | — | 5 | 450 | 450 | VG | VG | VG |
| Example 3-5 | ISB-DVE (20) 4CH-DVE (20) | CELLOXIDE 3000 (50) | OXT-221 (10) | 5 | 300 | 300 | VG | Good | VG |
| Example 3-6 | ISB-DVE (20) 4CH-DVE (10) | CELLOXIDE 3000 (50) CELLOXIDE 2021P (10) | OXT-221 (10) | 5 | 250 | 250 | VG | VG | VG |
| Example 3-7 | ISB-DVE (20) | CELLOXIDE 3000 (30) CELLOXIDE 2021P (20) | OXT-212 (30) | 5 | 300 | 300 | VG | VG | VG |
| Example 3-8 | ISB-DVE (20) | CELLOXIDE 3000 (30) CELLOXIDE 2021P (20) | OXT-212 (30) | 5 | 300 | 300 | VG | VG | VG |
| Example 3-9 | ONB-DVE (20) | CELLOXIDE 3000 (30) CELLOXIDE 2021P (20) | OXT-212 (30) | 5 | 300 | 300 | VG | VG | VG |
| Example 3-10 | ISB-DVE (25) 4CH-DVE (25) | CELLOXIDE 3000 (20) | OXT-212 (30) | 5 | 300 | 300 | VG | VG | VG |
| Example 3-11 | ISB-DVE (25) 4CH-DVE (15) | CELLOXIDE 3000 (20) | OXT-212 (30) OXT-221 (10) | 5 | 250 | 250 | VG | Good | VG |
| Comp. Ex. 3-1 | ONB-DVE (50) 4CH-DVE (20) | — | OXT-212 (30) | 5 | 150 | 250 | Poor | Good | VG |
| Comp. Ex. 3-2 | ISB-DVE (50) 4CH-DVE (20) | — | OXT-212 (30) | 5 | 200 | 400 | Poor | Good | VG |
| Comp. Ex. 3-3 | ISB-DVE (50) | CELLOXIDE 3000 (20) | OXT-212 (30) | 5 | 400 | 600 | Poor | VG | VG |
| Comp. Ex. 3-4 | ONB-DVE (25) | CELLOXIDE 3000 (30) | OXT-221 (45) | 5 | 500 | >1000 | Poor | Poor | Poor |

TABLE 7

| | Curable composition | | | | Curability (integrated irradiance in mJ/cm$^2$) | | Curability in the presence of water | Substrate adhesion | |
|---|---|---|---|---|---|---|---|---|---|
| | Monomer composition | | | Photoacid generator (part by weight) | Water-free composition | Composition containing 5% water | | Glass plate | PET plate |
| | Vinyl ether compound (part by weight) | Epoxy compound (part by weight) | Oxetane compound (part by weight) | | | | | | |
| Example 3-12 | ONB-DVE (20) 4CH-DVE (20) | CELLOXIDE 3000 (50) X-22-163 (10) | — | 5 | 400 | 400 | VG | VG | VG |
| Example 3-13 | ISB-DVE (20) 4CH-DVE (20) | CELLOXIDE 3000 (50) KF-105 (10) | — | 5 | 450 | 450 | VG | VG | VG |

TABLE 7-continued

| | Curable composition | | | Photoacid generator (part by weight) | Curability (integrated irradiance in mJ/cm$^2$) | | Curability in the presence of water | Substrate adhesion | |
|---|---|---|---|---|---|---|---|---|---|
| | Monomer composition | | | | | | | | |
| | Vinyl ether compound (part by weight) | Epoxy compound (part by weight) | Oxetane compound (part by weight) | | Water-free composition | Composition containing 5% water | | Glass plate | PET plate |
| Example 3-14 | ISB-DVE (25) | CELLOXIDE 3000 (30) EP0408 (15) | OXT-212 (30) | 5 | 350 | 350 | VG | VG | VG |

TABLE 8

| | Curable composition | | | | | | Curability (integrated irradiance in mJ/cm$^2$) | | Curability in the presence of water | Substrate adhesion | |
|---|---|---|---|---|---|---|---|---|---|---|---|
| | Monomer composition | | | | | Photoacid generator (part by weight) | | | | | |
| | Cyclic ether skeleton-containing divinyl ether (part by weight) | Alicyclic divinyl ether (part by weight) | Other vinyl ether compound (part by weight) | Epoxy compound (part by weight) | Oxetane compound (part by weight) | | Water-free composition | Composition containing 5% water | | Glass plate | PET plate |
| Example 4-1 | ONB-DVE (25) | 4CH-DVE (25) | — | CELLOXIDE 2021P (20) | OXT-212 (30) | 5 | 150 | 150 | VG | VG | VG |
| Example 4-2 | ISB-DVE (25) | 4CH-DVE (25) | — | CELLOXIDE 2021P (20) | OXT-212 (30) | 5 | 200 | 200 | VG | VG | VG |
| Example 4-3 | ONB-DVE (25) | CHDMDVE (25) | — | CELLOXIDE 2021P (20) | OXT-212 (30) | 5 | 250 | 250 | VG | VG | VG |
| Example 4-4 | ISB-DVE (25) | CHDMDVE (25) | — | CELLOXIDE 2021P (20) | OXT-212 (30) | 5 | 300 | 300 | VG | VG | VG |
| Example 4-5 | ONB-DVE (25) | TCDDVE (25) | — | CELLOXIDE 2021P (20) | OXT-212 (30) | 5 | 150 | 150 | VG | VG | VG |
| Example 4-6 | ISB-DVE (25) | TCDDVE (25) | — | CELLOXIDE 2021P (20) | OXT-212 (30) | 5 | 150 | 150 | VG | VG | VG |
| Example 4-7 | ONB-DVE (25) | HBisF-DVE (25) | — | CELLOXIDE 2021P (20) | OXT-212 (30) | 5 | 200 | 200 | VG | VG | VG |
| Example 4-8 | ISB-DVE (25) | HBisF-DVE (25) | — | CELLOXIDE 2021P (20) | OXT-212 (30) | 5 | 200 | 200 | VG | VG | VG |
| Example 4-9 | ONB-DVE (25) | HBisA-DVE (25) | — | CELLOXIDE 2021P (20) | OXT-212 (30) | 5 | 200 | 200 | VG | VG | VG |
| Example 4-10 | ISB-DVE (25) | HBisA-DVE (25) | — | CELLOXIDE 2021P (20) | OXT-212 (30) | 5 | 200 | 200 | VG | VG | VG |
| Example 4-11 | ONB-DVE (25) | HBP-DVE (25) | — | CELLOXIDE 2021P (20) | OXT-212 (30) | 5 | 200 | 200 | VG | VG | VG |
| Example 4-12 | ISB-DVE (25) | HBP-DVE (25) | — | CELLOXIDE 2021P (20) | OXT-212 (30) | 5 | 250 | 250 | VG | VG | VG |
| Example 4-13 | ONB-DVE (25) | 4CH-DVE (25) | — | — | OXT-212 (50) | 5 | 250 | 250 | VG | VG | VG |
| Example 4-14 | ISB-DVE (25) | 4CH-DVE (25) | — | — | OXT-212 (50) | 5 | 250 | 250 | VG | VG | VG |
| Example 4-15 | ONB-DVE (25) | 4CH-DVE (45) | — | — | OXT-212 (30) | 5 | 150 | 150 | VG | Good | VG |
| Example 4-16 | ISB-DVE (25) | 4CH-DVE (45) | — | — | OXT-212 (30) | 5 | 175 | 175 | VG | Good | VG |
| Example 4-17 | ONB-DVE (25) | 4CH-DVE (10) | — | CELLOXIDE 2021P (20) | OXT-212 (45) | 5 | 250 | 250 | VG | VG | VG |
| Example 4-18 | ISB-DVE (25) | 4CH-DVE (10) | — | CELLOXIDE 2021P (20) | OXT-212 (45) | 5 | 250 | 250 | VG | VG | VG |
| Example 4-19 | ONB-DVE (25) | 4CH-DVE (25) | — | — | OXT-212 (30) OXT-221 (20) | 5 | 300 | 350 | Good | Good | VG |
| Example 4-20 | ISB-DVE (25) | 4CH-DVE (25) | — | — | OXT-212 (30) OXT-221 (20) | 5 | 300 | 350 | Good | Good | VG |
| Comp. Ex. 4-1 | ONB-DVE (50) | — | — | CELLOXIDE 2021P (20) | OXT-212 (30) | 5 | 200 | 300 | Poor | VG | VG |
| Comp. Ex. 4-2 | ISB-DVE (50) | — | — | CELLOXIDE 2021P (20) | OXT-212 (30) | 5 | 300 | 450 | Poor | VG | VG |
| Comp. Ex. 4-3 | ONB-DVE (50) | 4CH-DVE (20) | — | — | OXT-212 (30) | 5 | 150 | 250 | Poor | Good | VG |
| Comp. Ex. 4-4 | ISB-DVE (50) | 4CH-DVE (20) | — | — | OXT-212 (30) | 5 | 200 | 400 | Poor | Good | VG |
| Comp. Ex. 4-5 | ISB-DVE (50) | 4CH-DVE (10) | — | CELLOXIDE 2021P (10) | OXT-212 (30) | 5 | 250 | 400 | Poor | VG | VG |

TABLE 8-continued

| | Curable composition | | | | | Curability | | | | |
|---|---|---|---|---|---|---|---|---|---|---|
| | Monomer composition | | | | | | | | | |
| | Cyclic ether skeleton-containing divinyl ether (part by weight) | Alicyclic divinyl ether (part by weight) | Other vinyl ether compound (part by weight) | Epoxy compound (part by weight) | Oxetane compound (part by weight) | Photoacid generator (part by weight) | (integrated irradiance in mJ/cm²) | | Curability in the presence of water | Substrate adhesion | |
| | | | | | | | Water-free composition | Composition containing 5% water | | Glass plate | PET plate |
| Comp. Ex. 4-6 | — | 4CH-DVE (50) | — | CELLOXIDE 2021P (20) | OXT-212 (30) | 5 | 200 | 250 | Poor | Poor | Poor |
| Comp. Ex. 4-7 | — | — | TEGDVE (50) | CELLOXIDE 2021P (20) | OXT-212 (30) | 5 | 500 | >1000 | Poor | VG | VG |

TABLE 9

| | Curable composition | | | | | | Curability | | | | |
|---|---|---|---|---|---|---|---|---|---|---|---|
| | Monomer composition | | | | | | (integrated irradiance in mJ/cm²) | | | | |
| | Cyclic ether skeleton-containing divinyl ether (part by weight) | Alicyclic divinyl ether (part by weight) | Other Vinyl ether compound (part by weight) | Epoxy compound (part by weight) | Oxetane compound (part by weight) | Photoacid generator (part by weight) | Water-free composition | Composition containing 5% water | Curability in the presence of water | Substrate adhesion | |
| | | | | | | | | | | Glass plate | PET plate |
| Example 4-21 | ONB-DVE (25) | 4CH-DVE (25) | — | CELLOXIDE 2021P (10) X-22-163 (10) | OXT-212 (30) | 5 | 250 | 250 | VG | VG | VG |
| Example 4-22 | ISB-DVE (25) | 4CH-DVE (25) | — | CELLOXIDE 2021P (10) EP0409 (10) | OXT-212 (30) | 5 | 300 | 300 | VG | VG | VG |

TABLE 10

| | Curable composition | | | | | Curability (integrated irradiance in mJ/cm²) | | Curability in the presence of water | Substrate adhesion | |
|---|---|---|---|---|---|---|---|---|---|---|
| | Monomer composition | | | Monofunctional monomer (weight percent) | Photoacid generator (part by weight) | | | | | |
| | Vinyl ether compound (part by weight) | Oxetane compound (part by weight) | Epoxy compound (part by weight) | | | Water-free composition | Composition containing 5% water | | Glass plate | PET plate |
| Example 5-1 | ISB-DVE (25) TEGDVE (15) | OXT-212 (40) | CELLOXIDE 2021P (20) | 40 | 5 | 400 | 400 | VG | VG | VG |
| Example 5-2 | ISB-DVE (25) TEGDVE (15) 4CH-DVE (10) | OXT-212 (30) | CELLOXIDE 2021P (20) | 30 | 5 | 300 | 300 | VG | VG | VG |
| Example 5-3 | ONB-DVE (25) TEGDVE (15) | OXT-212 (40) | CELLOXIDE 2021P (20) | 40 | 5 | 350 | 350 | VG | VG | VG |
| Example 5-4 | ISB-DVE (25) DEGDVE (15) | OXT-212 (40) | CELLOXIDE 2021P (20) | 40 | 5 | 400 | 400 | VG | VG | VG |
| Example 5-5 | ISB-DVE (25) TEGDVE (15) 4CH-DVE (10) | ALOX (30) | CELLOXIDE 2021P (20) | 30 | 5 | 250 | 250 | VG | VG | VG |
| Example 5-6 | ISB-DVE (25) TEGDVE (15) 4CH-DVE (10) | OXT-212 (40) OXT-221 (10) | — | 40 | 5 | 400 | 450 | Good | VG | VG |
| Example 5-7 | ISB-DVE (25) TEGDVE (15) 4CH-DVE (10) | ALOX (10) OXT-212 (30) OXT-221 (10) | — | 40 | 5 | 300 | 300 | VG | VG | VG |
| Example 5-8 | ONB-DVE (25) TEGDVE (15) 4CH-DVE (10) | OXT-212 (40) OXT-221 (10) | — | 40 | 5 | 350 | 400 | Good | VG | VG |

TABLE 10-continued

| | Curable composition | | | | | Curability (integrated irradiance in mJ/cm$^2$) | | Curability in the presence of water | Substrate adhesion | |
|---|---|---|---|---|---|---|---|---|---|---|
| | Monomer composition | | | Mono-functional monomer (weight percent) | Photoacid generator (part by weight) | | | | | |
| | Vinyl ether compound (part by weight) | Oxetane compound (part by weight) | Epoxy compound (part by weight) | | | Water-free composition | Composition containing 5% water | | Glass plate | PET plate |
| Example 5-9 | ISB-DVE (25) TEGDVE (15) CHVE (10) | OXT-212 (30) | CELLOXIDE 2021P (20) | 40 | 5 | 300 | 300 | VG | VG | VG |
| Example 5-10 | ISB-DVE (25) TEGDVE (15) 4CH-DVE (10) | OXT-221 (20) | CHOX (30) | 30 | 5 | 350 | 300 | VG | VG | VG |
| Comp. Ex. 5-1 | ONB-DVE (50) | OXT-212 (30) | CELLOXIDE 2021P (20) | 30 | 5 | 200 | 300 | Poor | VG | VG |
| Comp. Ex. 5-2 | ONB-DVE (50) | OXT-212 (50) | — | 50 | 5 | 250 | 600 | Poor | VG | VG |
| Comp. Ex. 5-3 | ISB-DVE (50) | OXT-212 (30) | CELLOXIDE 2021P (20) | 30 | 5 | 300 | 450 | Poor | VG | VG |
| Comp. Ex. 5-4 | TEGDVE (50) | OXT-212 (30) | CELLOXIDE 2021P (20) | 30 | 5 | 500 | >1000 | Poor | VG | VG |
| Comp. Ex. 5-5 | ISB-DVE (50) | OXT-212 (50) | — | 50 | 5 | 300 | 600 | Poor | VG | VG |

TABLE 11

| | Curable composition | | | | | Curability (integrated irradiance: mJ/cm$^2$) | | Curability in the presence of water | Substrate adhesion | |
|---|---|---|---|---|---|---|---|---|---|---|
| | Monomer composition | | | Mono-functional monomer (weight percent) | Photoacid generator (part by weight) | | | | | |
| | Vinyl ether compound (part by weight) | Oxetane compound (part by weight) | Epoxy compound (part by weight) | | | Water-free composition | Composition containing 5% water | | Glass plate | PET plate |
| Example 5-11 | ISB-DVE (25) TEGDVE (15) | OXT-212 (40) | X-22-163 (20) | 40 | 5 | 450 | 450 | VG | VG | VG |
| Example 5-12 | ISB-DVE (25) TEGDVE (15) 4CH-DVE (10) | OXT-212 (30) | CELLOXIDE 2021P (10) EP0408 (10) | 30 | 5 | 350 | 350 | VG | VG | VG |

The compounds used in the examples and comparative examples are as follows:

Vinyl Ether Compounds

ONB-DVE: the compound represented by Formula (a-1), trade name ONB-DVE, supplied by Daicel Corporation ISB-DVE: the compound represented by Formula (a-2), trade name ISB-DVE, supplied by Daicel Corporation TEGDVE: triethylene glycol divinyl ether, trade name TEGDVE, supplied by Nippon Carbide Industries, Co., Inc.

4CH-DVE: cyclohexanediol divinyl ether, trade name 4CH-DVE, supplied by Nippon Carbide Industries, Co., Inc.

CHDMDVE: cyclohexanedimethanol divinyl ether, trade name CHDMDVE, supplied by Nippon Carbide Industries, Co., Inc.

TCDDVE: tricyclodecanedimethanol divinyl ether

HBisF-DVE: hydrogenated bisphenol-F divinyl ether

HBisA-DVE: hydrogenated bisphenol-A divinyl ether

HBP-DVE: hydrogenated biphenyl divinyl ether

CHVE: cyclohexyl vinyl ether, trade name CHVE, supplied by Nippon Carbide Industries, Co., Inc.

2-EHVE: 2-ethylhexyl vinyl ether, trade name EHVE, supplied by Nippon Carbide Industries, Co., Inc.

Epoxy Compounds

CELLOXIDE 2021P: 3,4-epoxycyclohexylmethyl (3,4-epoxy)cyclohexanecarboxylate, trade name CELLOXIDE 2021P, supplied by Daicel Corporation CELLOXIDE 3000: 1,2:8,9-diepoxylimonene, trade name CELLOXIDE 3000, supplied by Daicel Corporation E-PS: di-2-ethylhexyl epoxyhexahydrophthalate, trade name SANSO CIZER E-PS, supplied by New Japan Chemical Co., Ltd.

CHOX: 1,2-epoxycyclohexane, supplied by Wako Pure Chemical Industries, Ltd.

EP0408: an epoxy-modified (3,4-epoxycyclohexylmethyl-modified) polyorganosilsesquioxane, having a molecular weight of 1418.20, trade name EP0408, supplied by Toyotsu Chemiplas Corporation EP0409: an epoxy-modified (glycidyloxyethyl-modified) polyorganosilsesquioxane, having a molecular weight of 1337.88, trade name EP0409, supplied by Toyotsu Chemiplas Corporation EP0419: an epoxy-modified (glycidyloxypropyl-modified) polyorganosilsesquioxane, having a molecular weight of 1324.37, trade name EP0419, supplied by Toyotsu Chemiplas Corporation X-22-163: a silicone modified with epoxy groups at both ends, having an epoxy equivalent of 200 g/mol, trade name X-22-163, supplied by Shin-Etsu Chemical Co., Ltd.

KF-105: a silicone modified with epoxy groups at both ends, having an epoxy equivalent of 490 g/mol, trade name KF-105, supplied by Shin-Etsu Chemical Co., Ltd.

Oxetane Compounds

OXT-212: 3-ethyl-3-[(2-ethylhexyloxy)methyl]oxetane, trade name ARON OXETANE OXT-212, supplied by Toagosei Co., Ltd.

OXT-221: bis[(3-ethyloxetan-3-yl)methyl] ether, trade name ARON OXETANE OXT-221, supplied by Toagosei Co., Ltd.

ALOX: 3-allyloxyoxetane

EHOX: 3-(2-ethylhexyloxy) oxetane Photoacid Generator

Trade name CPI-110P, supplied by San-Apro Ltd., a 99.5:0.5 mixture of diphenyl[4-(phenylthio)phenyl]sulfonium hexafluorophosphate and thiodi-p-phenylenebis(diphenylsulfonium) bis(hexafluorophosphate)

INDUSTRIAL APPLICABILITY

The UV-curable inkjet inks containing the monomer compositions according to the present invention, when used, can form ink layers with extremely high definition at high speed in an air atmosphere, where the ink layers can be formed without limitations on humidity conditions and on substrates, while less causing odors. Thus, the UV-curable inkjet inks containing the monomer compositions according to the present invention are advantageously usable in the field of industrial printing.

The invention claimed is:

1. A monomer composition comprising:
   a vinyl ether compound (A);
   an oxetane compound (B); and
   an epoxy compound (C),
   wherein the vinyl ether compound (A) comprises at least one of a compound represented by Formula (a-1) and a compound represented by Formula (a-2) in a content of from 5 to 25 weight percent of a total weight of the monomer composition:

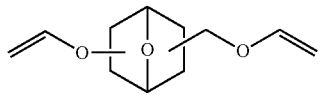
(a-1)

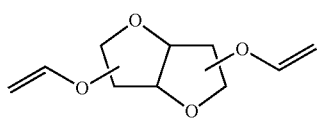
(a-2)

wherein the oxetane compound (B) comprises 3-ethyl-3-[(2-ethylhexyloxy)methyl]oxetane in a content of from 5 to 60 weight percent of a total weight of the monomer composition,
and
the epoxy compound (C) comprises an epoxy compound represented by Formula (c) in a content of from 5 to 60 weight percent of a total weight of the monomer composition:

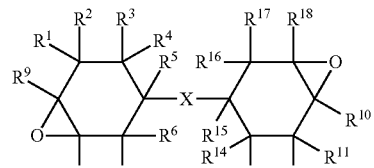
(c)

wherein $R^1$ to $R^{18}$ are each, identically or differently, selected from hydrogen, halogen, a hydrocarbon group optionally containing oxygen or halogen, and optionally substituted alkoxy, and X is selected from a single bond and a linkage group.

2. A curable composition comprising:
   the monomer composition according to claim 1; and
   a photoacid generator.

3. The curable composition according to claim 2, further comprising
   a sensitizer alone or in combination with a sensitizing auxiliary.

4. The curable composition according to claim 2, which has a surface tension of 10 to 50 mN/m at 25° C. and 1 atmospheric pressure and a viscosity of 1 to 1000 mPa·s at 25° C. and a shear rate of 10 (1/s).

5. The curable composition according to claim 2, for use in a UV-curable inkjet ink.

6. A UV-curable inkjet ink comprising:
   the curable composition according to claim 2; and
   at least one selected from the group consisting of pigments and dyes.

7. The UV-curable inkjet ink according to claim 6, further comprising a dispersant.

8. The monomer composition according to claim 1, wherein a curable composition comprising the monomer composition and a photoacid generator has a curability evaluation as follows:
   {((Integrated irradiance necessary for curing of water-containing curable composition)/(Integrated irradiance necessary for curing of water-free curable composition)) −1}×100 <20
   wherein the "water-free curable composition" is the curable composition and
   the "water-containing curable composition" is a composition of 100 parts by weight of the curable composition combined with 5 parts by weight of water.

9. The curable composition according to claim 2, which has a curability evaluation as follows:
   {((Integrated irradiance necessary for curing of water-containing curable composition)/(Integrated irradiance necessary for curing of water-free curable composition)) −1}×100<20
   wherein the "water-free curable composition" is the curable composition and
   the "water-containing curable composition" is a composition of 100 parts by weight of the curable composition combined with 5 parts by weight of water.

* * * * *